United States Patent
Chen et al.

(10) Patent No.: US 9,185,439 B2
(45) Date of Patent: Nov. 10, 2015

(54) SIGNALING DATA FOR MULTIPLEXING VIDEO COMPONENTS

(75) Inventors: Ying Chen, San Diego, CA (US); Marta Karczewicz, San Diego, CA (US); Yong Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 12/986,028

(22) Filed: Jan. 6, 2011

(65) Prior Publication Data

US 2012/0013746 A1 Jan. 19, 2012

Related U.S. Application Data

(60) Provisional application No. 61/364,747, filed on Jul. 15, 2010, provisional application No. 61/366,436, filed on Jul. 21, 2010.

(51) Int. Cl.
*H04N 7/173* (2011.01)
*H04N 21/235* (2011.01)
(Continued)

(52) U.S. Cl.
CPC ............ *H04N 21/235* (2013.01); *G11B 27/034* (2013.01); *G11B 27/3027* (2013.01);
(Continued)

(58) Field of Classification Search
CPC ....................................................... H04N 7/173
USPC ................................................ 725/87, 92, 93
See application file for complete search history.

(56) References Cited

U.S. PATENT DOCUMENTS

| 4,901,319 A | 2/1990 | Ross |
| 5,329,369 A | 7/1994 | Willis et al. |

(Continued)

FOREIGN PATENT DOCUMENTS

| CN | 1338839 A | 3/2002 |
| CN | 1481643 A | 3/2004 |

(Continued)

OTHER PUBLICATIONS

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.

(Continued)

*Primary Examiner* — Kieu Oanh T Bui
(74) *Attorney, Agent, or Firm* — Brent A. Boyd

(57) ABSTRACT

A server may provide information describing characteristics of audio and video components to a client, separately from encoded samples of the audio and video components themselves. The client may use the information to select components, and then to request the selected components, e.g., in accordance with a streaming network protocol. In one example, an apparatus for sending encapsulated video data includes a processor configured to determine characteristics for components of a plurality of representations of video content, wherein the characteristics comprise at least one of a frame rate, a profile indicator, a level indicator, and dependencies between the components, and one or more interfaces configured to send the characteristics to a client device, receive a request from the client device for at least one of the components after sending the characteristics, and send the requested components to the client device in response to the request.

54 Claims, 5 Drawing Sheets

(51) Int. Cl.
  *G11B 27/034* (2006.01)
  *G11B 27/30* (2006.01)
  *H04N 21/435* (2011.01)
  *H04N 21/462* (2011.01)
  *H04N 21/845* (2011.01)
  *H04N 21/854* (2011.01)

(52) U.S. Cl.
  CPC ......... *H04N21/435* (2013.01); *H04N 21/4621* (2013.01); *H04N 21/8456* (2013.01); *H04N 21/85406* (2013.01)

(56) References Cited

U.S. PATENT DOCUMENTS

| | | | |
|---|---|---|---|
| 5,371,532 A | 12/1994 | Gelman et al. |
| 5,379,297 A | 1/1995 | Glover et al. |
| 5,421,031 A | 5/1995 | De Bey |
| 5,566,208 A | 10/1996 | Balakrishnan |
| 5,617,541 A | 4/1997 | Albanese et al. |
| 5,659,614 A | 8/1997 | Bailey, III |
| 5,701,582 A | 12/1997 | DeBey |
| 5,751,336 A | 5/1998 | Aggarwal et al. |
| 5,757,415 A | 5/1998 | Asamizuya et al. |
| 5,802,394 A | 9/1998 | Baird et al. |
| 5,835,165 A | 11/1998 | Keate et al. |
| 5,844,636 A | 12/1998 | Joseph et al. |
| 5,852,565 A | 12/1998 | Demos |
| 5,903,775 A | 5/1999 | Murray |
| 5,926,205 A | 7/1999 | Krause et al. |
| 5,936,659 A | 8/1999 | Viswanathan et al. |
| 5,936,949 A | 8/1999 | Pasternak et al. |
| 6,011,590 A | 1/2000 | Saukkonen |
| 6,018,359 A | 1/2000 | Kermode et al. |
| 6,055,012 A | 4/2000 | Haskell et al. |
| 6,061,820 A | 5/2000 | Nakakita et al. |
| 6,073,250 A | 6/2000 | Luby et al. |
| 6,079,041 A | 6/2000 | Kunisa et al. |
| 6,081,909 A | 6/2000 | Luby et al. |
| 6,134,596 A | 10/2000 | Bolosky et al. |
| 6,141,053 A | 10/2000 | Saukkonen |
| 6,141,787 A | 10/2000 | Kunisa et al. |
| 6,163,870 A | 12/2000 | Luby et al. |
| 6,166,544 A | 12/2000 | Debbins et al. |
| 6,185,265 B1 | 2/2001 | Campanella |
| 6,195,777 B1 | 2/2001 | Luby et al. |
| 6,226,259 B1 | 5/2001 | Piret |
| 6,226,301 B1 | 5/2001 | Cheng et al. |
| 6,307,487 B1 | 10/2001 | Luby |
| 6,320,520 B1 | 11/2001 | Luby |
| 6,332,163 B1 | 12/2001 | Bowman-Amuah |
| 6,411,223 B1 | 6/2002 | Haken et al. |
| 6,415,326 B1 | 7/2002 | Gupta et al. |
| 6,459,811 B1 | 10/2002 | Hurst, Jr. |
| 6,486,803 B1 | 11/2002 | Luby et al. |
| 6,496,980 B1 | 12/2002 | Tillman et al. |
| 6,510,177 B1 | 1/2003 | De Bonet et al. |
| 6,631,172 B1 | 10/2003 | Shokrollahi et al. |
| 6,732,325 B1 | 5/2004 | Tash et al. |
| 6,804,202 B1 | 10/2004 | Hwang |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,937,618 B2 | 8/2005 | Noda et al. |
| 6,985,459 B2 | 1/2006 | Dickson |
| 7,031,257 B1 | 4/2006 | Lu et al. |
| 7,068,681 B2 | 6/2006 | Chang et al. |
| 7,068,729 B2 | 6/2006 | Shokrollahi et al. |
| 7,073,191 B2 | 7/2006 | Srikantan et al. |
| 7,100,188 B2 | 8/2006 | Hejna et al. |
| 7,113,773 B2 | 9/2006 | Quick, Jr. et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,882 B2 | 1/2007 | Poltorak |
| 7,240,358 B2 | 7/2007 | Horn et al. |
| 7,257,764 B2 | 8/2007 | Suzuki et al. |
| 7,295,573 B2 | 11/2007 | Yi et al. |
| 7,304,990 B2 | 12/2007 | Rajwan |
| 7,318,180 B2 | 1/2008 | Starr |
| 7,363,048 B2 | 4/2008 | Cheng et al. |
| 7,391,717 B2 | 6/2008 | Klemets et al. |
| 7,409,626 B1 | 8/2008 | Schelstraete |
| 7,483,447 B2 | 1/2009 | Chang et al. |
| 7,483,489 B2 | 1/2009 | Gentric et al. |
| 7,529,806 B1 | 5/2009 | Shteyn |
| 7,555,006 B2 | 6/2009 | Wolfe et al. |
| 7,650,036 B2 | 1/2010 | Lei et al. |
| 7,668,198 B2 | 2/2010 | Yi et al. |
| 7,720,096 B2 * | 5/2010 | Klemets ..................... 370/466 |
| 7,924,913 B2 | 4/2011 | Sullivan et al. |
| 7,961,700 B2 | 6/2011 | Malladi et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,331,445 B2 | 12/2012 | Garudadri et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 2001/0015944 A1 | 8/2001 | Takahashi et al. |
| 2001/0033586 A1 | 10/2001 | Takashimizu |
| 2002/0009137 A1 | 1/2002 | Nelson et al. |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0008790 A1 | 1/2004 | Rodriguez |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0162071 A1 | 8/2004 | Grilli et al. |
| 2004/0240382 A1 | 12/2004 | Ido et al. |
| 2004/0255328 A1 | 12/2004 | Baldwin et al. |
| 2005/0041736 A1 | 2/2005 | Butler-Smith et al. |
| 2005/0071491 A1 | 3/2005 | Seo |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0105371 A1 | 5/2005 | Johnson et al. |
| 2005/0123058 A1 | 6/2005 | Greenbaum et al. |
| 2005/0160272 A1 | 7/2005 | Teppler |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0195899 A1 | 9/2005 | Han |
| 2005/0195900 A1 | 9/2005 | Han |
| 2005/0206537 A1 | 9/2005 | Shokrollahi et al. |
| 2005/0207392 A1 | 9/2005 | Sivalingham et al. |
| 2005/0216472 A1 | 9/2005 | Leon et al. |
| 2005/0216951 A1 | 9/2005 | MacInnis |

(56) References Cited

U.S. PATENT DOCUMENTS

| | | |
|---|---|---|
| 2005/0254575 A1 | 11/2005 | Hannuksela et al. |
| 2006/0015568 A1 | 1/2006 | Walsh et al. |
| 2006/0031738 A1 | 2/2006 | Fay et al. |
| 2006/0037057 A1 | 2/2006 | Xu |
| 2006/0107174 A1 | 5/2006 | Heise |
| 2006/0120464 A1 | 6/2006 | Hannuksela |
| 2006/0174021 A1 | 8/2006 | Osborne et al. |
| 2006/0193524 A1 | 8/2006 | Tarumoto et al. |
| 2006/0212444 A1 | 9/2006 | Handman et al. |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0279437 A1 | 12/2006 | Luby et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0078876 A1 | 4/2007 | Hayashi et al. |
| 2007/0140369 A1 | 6/2007 | Limberg et al. |
| 2007/0153914 A1 | 7/2007 | Hannuksela et al. |
| 2007/0162568 A1 | 7/2007 | Gupta et al. |
| 2007/0162611 A1 | 7/2007 | Yu et al. |
| 2007/0177811 A1 | 8/2007 | Yang et al. |
| 2007/0185973 A1 | 8/2007 | Wayda et al. |
| 2007/0200949 A1 | 8/2007 | Walker et al. |
| 2007/0201549 A1 | 8/2007 | Hannuksela et al. |
| 2007/0201819 A1 | 8/2007 | Sung et al. |
| 2007/0204196 A1 | 8/2007 | Watson et al. |
| 2007/0230564 A1 | 10/2007 | Chen et al. |
| 2007/0230568 A1 | 10/2007 | Eleftheriadis et al. |
| 2007/0233784 A1 | 10/2007 | ORourke et al. |
| 2007/0255844 A1 | 11/2007 | Shen et al. |
| 2007/0274389 A1 | 11/2007 | Kim et al. |
| 2007/0277209 A1 | 11/2007 | Yousef |
| 2008/0010153 A1 | 1/2008 | Pugh-O'Connor et al. |
| 2008/0010648 A1 | 1/2008 | Ando et al. |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0109557 A1 | 5/2008 | Joshi et al. |
| 2008/0134005 A1 | 6/2008 | Izzat et al. |
| 2008/0137744 A1 | 6/2008 | Moriya et al. |
| 2008/0152241 A1 | 6/2008 | Itoi et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1* | 8/2008 | DiPietro et al. .......... 375/240.01 |
| 2008/0215317 A1 | 9/2008 | Fejzo |
| 2008/0243918 A1 | 10/2008 | Holtman |
| 2008/0256418 A1 | 10/2008 | Luby et al. |
| 2008/0267287 A1 | 10/2008 | Hannuksela |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0043906 A1 | 2/2009 | Hurst et al. |
| 2009/0055705 A1 | 2/2009 | Gao |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0164653 A1 | 6/2009 | Mandyam et al. |
| 2009/0195640 A1 | 8/2009 | Kim et al. |
| 2009/0201990 A1 | 8/2009 | Leprovost et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van Gassel et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0032333 A1 | 2/2011 | Neuman et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0119394 A1 | 5/2011 | Wang et al. |
| 2011/0119396 A1 | 5/2011 | Kwon et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0268178 A1 | 11/2011 | Park et al. |
| 2011/0307545 A1 | 12/2011 | Bouazizi |
| 2011/0317760 A1 | 12/2011 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0105583 A1 | 5/2012 | Suh et al. |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |
| 2014/0380113 A1 | 12/2014 | Luby et al. |

FOREIGN PATENT DOCUMENTS

| | | |
|---|---|---|
| CN | 1708934 A | 12/2005 |
| CN | 1714577 A | 12/2005 |
| CN | 1806392 A | 7/2006 |
| CN | 1819661 A | 8/2006 |
| CN | 1868157 A | 11/2006 |
| CN | 1909865 A | 2/2007 |

(56) References Cited

FOREIGN PATENT DOCUMENTS

| | | | |
|---|---|---|---|
| CN | 101390399 A | 3/2009 |
| CN | 101690118 A | 3/2010 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0986908 A1 | 3/2000 |
| EP | 1051027 A1 | 11/2000 |
| EP | 1124344 A1 | 8/2001 |
| EP | 1298931 A2 | 4/2003 |
| EP | 1406452 A2 | 4/2004 |
| EP | 1455504 A2 | 9/2004 |
| EP | 1670256 A2 | 6/2006 |
| EP | 1746826 A1 | 1/2007 |
| EP | 2071827 A2 | 6/2009 |
| EP | 1700410 B1 | 4/2010 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11164270 A | 6/1999 |
| JP | 2000151426 A | 5/2000 |
| JP | 2000513164 A | 10/2000 |
| JP | 2000353969 A | 12/2000 |
| JP | 2001094625 | 4/2001 |
| JP | 2001223655 A | 8/2001 |
| JP | 2001274776 A | 10/2001 |
| JP | 2002073625 A | 3/2002 |
| JP | 2002543705 A | 12/2002 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004070712 A | 3/2004 |
| JP | 2004135013 A | 4/2004 |
| JP | 2004192140 A | 7/2004 |
| JP | 2004193992 A | 7/2004 |
| JP | 2004529533 A | 9/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005277950 A | 10/2005 |
| JP | 2005533444 A | 11/2005 |
| JP | 2006503463 A | 1/2006 |
| JP | 2006506926 A | 2/2006 |
| JP | 2006074335 A | 3/2006 |
| JP | 2006115104 A | 4/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007506167 A | 3/2007 |
| JP | 2007089137 A | 4/2007 |
| JP | 2007158592 A | 6/2007 |
| JP | 2007174170 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008283232 A | 11/2008 |
| JP | 2008283571 A | 11/2008 |
| JP | 2008546361 A | 12/2008 |
| JP | 2009027598 A | 2/2009 |
| JP | 2009512307 A | 3/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010516123 A | 5/2010 |
| JP | 2010530703 A | 9/2010 |
| JP | 2010539832 A | 12/2010 |
| JP | 2011087103 A | 4/2011 |
| JP | 4971144 B2 | 7/2012 |
| JP | 2012517160 A | 7/2012 |
| JP | 2012523747 A | 10/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| KR | 20100015611 A | 2/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | 1246841 B | 1/2006 |
| TW | 1354908 | 12/2011 |
| TW | 1355168 | 12/2011 |
| WO | 9750183 A1 | 12/1997 |
| WO | WO 9804973 A1 | 2/1998 |
| WO | 9832231 | 7/1998 |
| WO | WO-9832256 A1 | 7/1998 |
| WO | 0120786 | 3/2001 |
| WO | WO 0157667 A1 | 8/2001 |
| WO | WO 0158130 A2 | 8/2001 |
| WO | WO 0158131 A2 | 8/2001 |
| WO | WO 0227988 A2 | 4/2002 |
| WO | WO 0247391 | 6/2002 |
| WO | 0263461 A1 | 8/2002 |
| WO | WO-03046742 A1 | 6/2003 |
| WO | 03105350 | 12/2003 |
| WO | 03105484 A1 | 12/2003 |
| WO | WO 2004015948 A1 | 2/2004 |
| WO | 2004034589 A2 | 4/2004 |
| WO | 2004036824 A1 | 4/2004 |
| WO | 2004047019 A2 | 6/2004 |
| WO | WO 2004047455 A1 | 6/2004 |
| WO | 2004088988 A1 | 10/2004 |
| WO | WO-2004109538 A1 | 12/2004 |
| WO | 2005036753 A2 | 4/2005 |
| WO | 2005107123 | 11/2005 |
| WO | 2005120079 A2 | 12/2005 |
| WO | 2006020826 A2 | 2/2006 |
| WO | WO-2006013459 A1 | 2/2006 |
| WO | 2006036276 | 4/2006 |
| WO | 2006057938 A2 | 6/2006 |
| WO | 2006060036 A1 | 6/2006 |
| WO | WO 2006084503 A1 | 8/2006 |
| WO | 2006116102 A2 | 11/2006 |
| WO | 2006135878 A2 | 12/2006 |
| WO | 2007078253 A2 | 7/2007 |
| WO | 2007098397 A2 | 8/2007 |
| WO | WO-2007098480 A1 | 8/2007 |
| WO | 07115129 | 10/2007 |
| WO | 2008011549 A2 | 1/2008 |
| WO | WO-2008023328 A3 | 4/2008 |
| WO | WO 2008054100 A1 | 5/2008 |
| WO | 2008086313 A1 | 7/2008 |
| WO | WO 2008085013 A1 | 7/2008 |
| WO | 2008144004 A1 | 11/2008 |
| WO | 2009065526 A1 | 5/2009 |
| WO | 2009137705 A2 | 11/2009 |
| WO | 2009143741 A1 | 12/2009 |
| WO | 2010041896 A2 | 4/2010 |
| WO | WO 2010085361 A2 | 7/2010 |
| WO | 2010091143 A1 | 8/2010 |
| WO | WO 2010088420 A1 | 8/2010 |
| WO | 2010117316 A1 | 10/2010 |

(56) References Cited

FOREIGN PATENT DOCUMENTS

| WO | WO-2011038013 |  | 3/2011 |
|---|---|---|---|
| WO | WO-2011038034 | A1 | 3/2011 |
| WO | 2011059286 | A2 | 5/2011 |
| WO | 2011070552 | A1 | 6/2011 |
| WO | 2011102792 | A1 | 8/2011 |
| WO | 2012021540 |  | 2/2012 |
| WO | 2012109614 | A1 | 8/2012 |

OTHER PUBLICATIONS

3rd Generation Partnership Project, Technical Specification Group Services and System Aspects Transparent end-to-end packet switched streaming service (PSS), 3GPP file format (3GP) (Release 9), 3GPP Standard, 3GPP TS 26.244, 3RD Generation Partnership Project (3GPP), Mobile Competence Centre, 650, Route Des Lucioles, F-06921 Sophia-Antipolis Cedex, France, No. V8.1.0, Jun. 1, 2009 (Jun. 1, 2009), pp. 1-52, XP050370199.

3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3RD Generation Partnership Project (3GPP), Mobile Competence Centre; 650, Route Des Lucioles; F-06921 Sophia-Antipolis Cedex; France, No. V9.2.0, Jun. 9, 2010 (Jun. 9, 2010), pp. 1-55, XP050441544, [retrieved on Jun. 9, 2010].

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli, "IIS Smooth Streaming Technical Overview", Microsoft Mar. 25, 2009 (Mar. 25, 2009), XP002620446, Retrieved from the Internet: URL:http://www.microsoft.com/downloads/en/details.aspx FamilyID=03d22583-3ed6-44da-8464-blb4b5ca7520, [retrieved on Jan. 21, 2011].

Almeroth, et al., "The use of multicast delivery to provide a scalable and interactive video-on-demand service", IEEE Journal on Selected Areas in Communication, 14(6): 1110-1122, (1996).

Amon P et al., "File Format for Scalable Video Coding", IEEE Transactions on Circuits and Systems for Video Technology, IEEE Service Center, Piscataway, NJ, US, vol. 17, No. 9, Sep. 1, 2007 (Sep. 1, 2007), pp. 1174-1185, XP011193013, ISSN: 1051-8215, DOI:10.1109/TCSVT.2007.905521.

Anonymous: [Gruneberg, K., Narasimhan, S. And Chen, Y., editors] "Text of ISO/IEC 13818-1:2007/PDAM 6 MVC operation point descriptor", 90 MPEG Meeting; Oct. 26, 2009-Oct. 30, 2009; Xian; (Motion Picture Expertgroup or ISO/IEC JTC1/SC29/WG11), No. N10942, Nov. 19, 2009 (Nov. 19, 2009), XP030017441.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008 (Apr. 22, 2008), XP030016172.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11),, No. N11139, Jan. 22, 2010 (Jan. 22, 2010), XP030017636.

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].

Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.

Dan, A. et al.: "Scheduling Policies for an On-Demand Video Server with Batching,".

Proc. ACM Multimedia, pp. 15-23 (1998-10).

Eager, et al. "Minimizing bandwidth requirements for on-demand data delivery," Proceedings of the International Workshop on Advances in Multimedia Information Systems,p. 80-87 (Indian Wells, CA Oct. 1999).

Eager, et al., "Optimal and efficient merging schedules for video-on-demand servers", Proc. ACM Multimedia, vol. 7, pp. 199-202 (1999).

Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010 (Jul. 22, 2010), XP030046346.

Gao, L. et al.: "Efficient Schemes for Broadcasting Popular Videos," Proc. Inter. Workshop on Network and Operating System Support for Digital Audio and Video, pp. 1-13 (1998).

Hua, et al., "Skyscraper broadcasting: A new broadcsting system for metropolitan video-on-demand systems", Proc. ACM SIGCOMM, pp. 89-100 (Cannes, France, 1997).

Huawei et al., "Implict mapping between CCE and PUCCH for ACK/NACK TDD", 3GPP Draft; R1-082359, 3RD Generation Partnership Project (3GPP), Mobile Competence Centre; 650, Route Des Lucioles ; F-06921 Sophia-Antipolis Cedex ; France, vol. RAN WG1, No. Warsaw, Poland, Jun. 24, 2008, XP050110650, [retrieved on Jun. 24, 2008].

International Search Report and Written Opinion—PCT/US2011/044284, ISA/EPO—Oct. 21, 2011.

ISO/IEC JTC 1/SC 29, ISO/IEC FCD 23001-6, Information technology—MPEG systems technologies—Part 6: Dynamic adaptive streaming over HTTP (DASH), Jan. 28, 2011.

Juhn, L. et al.: "Adaptive Fast Data Broadcasting Scheme for Video-on-Demand Service," IEEE Transactions on Broadcasting, vol. 44, No. 2, pp. 182-185 (Jun. 1998).

Juhn, L. et al.: "Harmonic Broadcasting for Video-on-Demand Service," IEEE Transactions on Broadcasting, vol. 43, No. 3, pp. 268-271 (Sep. 1997).

Kozamernik F: "Media streaming over the Internet", Internet Citation, Oct. 2002 (Oct. 2002), XP002266291, Retrieved from the Internet: URL: http://www.ebu.ch/trev_292-kozamerni k. pdf [retrieved on Jan. 8, 2004] section "Video codecs for scalable streaming".

Luby, et al., "FLUTE—File Delivery over Unidirectional Transport", IETF RFC 3926, pp. 1-35, (Oct. 2004).

Luby et, al. "Layered Coding Transport (LCT) Building Block", IETF RFC 5651, pp. 1-42, (Oct. 2009).

Luby, M., et, al. "Forward Error Correction (FEC) Building Block", IETF RFC 5052, pp. 1-31, (Aug. 2007).

Luby, M., et al., "Raptor Forward Error Correction Scheme for Object Delivery", IETF RFC5053, pp. 1-46 (Sep. 2007).

Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].

Luby, M., et al., "Request for Comments: 3453: The Use of Forward Error Correction (FEC) in Reliable Multicast," Internet Article, [Online] Dec. 2002, pp. 1-19.

Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].

Matsuoka H., et al., "Low-Density Parity-Check Code Extensions Applied for Broadcast-Communication Integrated Content Delivery", Research Laboratories, NTT Docomo, Inc., 3-6, Hikari-No-Oka, Yokosuka, Kanagawa, 239-8536, Japan, ITC-SS21, 2010 IEICE, pp. 59-63.

Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.

(56) References Cited

OTHER PUBLICATIONS

Nokia Corp., "Usage of 'mfra' box for Random Access and Seeking," S4-AHI127, 3GPP TSG-SA4 Ad-Hoc Meeting, Dec. 14th-16th, 2009, Paris, FR, 2 pp.
Ozden, B. et al.: "A Low-Cost Storage Service for Movie on Demand Databases," Proceedings of the 20th Very Large DataBases (VLDB) Conference, Santiago, Chile (1994).
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Pantos R et al., "HTTP Live Streaming; draft-pantos-http-live-streaming-OT.txt ", HTTP Live Streaming; Draft-Pant0s-HTTP-Live-Streaming-01.TXT, Internet Engineering Task Force, IETF; Standardworkingdraft, Internet Society (ISOC) 4, Rue Des Falaises CH- 1205 Geneva, Switzerland, No. 1, Jun. 8, 2009 (Jun. 8, 2009), XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010 (Jul. 22, 2010), XP030046492.
Qualcomm Europe S A R L: "Baseline Architecture and Definitions for HTTP Streaming", 3GPP Draft; S4-090603_HTTP_Streaming_Architecture, 3RD Generation Partnership Project (3GPP), Mobile Competence Centre; 650, Route Des Lucioles; F-06921 Sophia-Antipolis Cedex; France, No. Kista; 20090812, Aug. 12, 2009 (Aug. 12, 2009), XP050356889.
Qualcomm Incorporated: "Use Cases and Examples for Adaptive httpstreaming", 3GPP Draft; S4-100408-Usecases-HSD, 3RD Generation Partnership Project (JGPP), Mobile Competence Centre; 650, Route Des Lucioles; F-06921 Sophia-Antipolis Cedex; France, vol. SA WG4, No. Prague, Czech Republic; 20100621, Jun. 17, 2010 (Jun. 17, 2010), XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc, et al., "Format for httpstreaming Media Presentation Description", 3GPP Draft; S4-100020, 3RD Generation Partnership Project (3GPP), Mobile Competence Centre; 650, Route Des Lucioles; F-06921 Sophia-Antipolis Cedex; France, vol. SA WG4, No. S t Julians, Malta; 20100125, Jan. 20, 2010, XP050437753, [retrieved on Jan. 20, 2010].
Research in Motion UK Limited: "An MPD delta file for httpstreaming", 3GPP Draft; S4-100453, 3RD Generation Partnership Project (SGPP), Mobile Competence Centre; 650, Route Des Lucioles; F-06921 Sophia-Antipolis Cedex; France, vol. SA WG4, No. Prague, Czech Republic; 20100621, Jun. 16, 2010 (Jun. 16, 2010), XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010 (Jul. 26, 2010), XP030046369.
Rizzo, L. "Effective Erasure Codes for Reliable Computer Communication Protocols," Computer Communication Review, 27 (2) pp. 24-36 (Apr. 1, 1997), XP000696916.
Roca, V., et, al. "Low Density Parity Check (LDPC) Staircase and Triangle Forward Error Correction (FEC) Schemes", IETF RFC 5170 (Jun. 2008), pp. 1-34.
Sincoskie, W. D., "System Architecture for Large Scale Video on Demand Service," Computer Network and ISDN Systems, pp. 155-162, (1991).

Telefon AB LM Ericsson, et al., "Media Presentation Description in httpstreaming", 3GPP Draft; S4-100080-MPD, 3RD Generation Partnership Project (3GPP), Mobile Competence Centre; 650, Route Des Lucioles; F-06921 Sophia-Antipolis Cedex; France, vol. SA WG4, No. St Julians, Malta; 20100125, Jan. 20, 2010 (Jan. 20, 2010), XP050437773, [retrieved on Jan. 20, 2010].
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010 (Jun. 1, 2010), XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs [12.6.3], [12.6.3.1], [12.6.4], [12.6.6].
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan, Subramaniyam R., "Publishing in Wireless and Wireline Environments," Ph. D Thesis, Rutgers, The State University of New Jersey (Nov. 1994), 180 pages.
Watson, M., et, al. "Asynchronous Layered Coding (ALC) Protocol Instantiation", IETF RFC 5775, pp. 1-23, (Apr. 2010).
Wong, J.W., "Broadcast delivery", Proceedings of the IEEE, 76(12): 1566-1577, (1988).
Zorzi, et al.: "On the Statistics of Block Errors in Bursty Channels," IEEE Transactions on Communications, vol. 45, No. 6, Jun. 1997, pp. 660-667.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005 (Jun. 1, 2005), XP002695256, Retrieved from the Internet: URL:http://www.etsi.org/deliver/etsi_ts/126300_126399/126346/06.01.00_60/ts_126346v060100p.pdf.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3RD Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011 (Jun. 17, 2011), pp. 1-94, XP050553206, [retrieved on Jun. 17, 2011].
Anonymous: "Technologies under Consideration", 100. MPEG Meeting;Apr. 30, 2012-May 4, 2012; Geneva; (Motion Picture Expert Group or ISO/IEC JTC1 /SC29/WG11),, No. N12682, Jun. 7, 2012 (Jun. 7, 2012), XP030019156.
ATIS: "PTV Content on Demand Service", IIF-WT-063R44, Nov. 11, 2010, pp. 1-124, XP055045168, Retrieved from the Internet: URL:ftp://vgeg.its.bldrdoc.gov/Documents/VQEG_Atlanta_Nov10/MeetingFiles/Liaison/IIF-WT-063R44_Content_on_Demand.pdf [retrieved on Nov. 22, 2012].
Bouazizi I., et al., "Proposals for ALC/FLUTE server file format (14496-12Amd.2)", 77.MPEG Meeting; Jul. 17, 2006-Jul. 21, 2006; Klagenfurt; (Motion Pictureexpert Group or ISO/IEC JTC1/SC29/WG11), No. M13675, Jul. 12, 2006 (Jul. 12, 2006), XP030042344, ISSN: 0000-0236.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

(56) References Cited

OTHER PUBLICATIONS

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Frojdh P., et al., "Study on 14496-12:2005/PDAM2 ALU/ Flute Server File Format", 78.MPEG Meeting; Oct. 23, 2006-Oct. 27, 2006; Hangzhou: (Motion Picturexpert Group or ISO/ IEC JTC1/SC29/WG11),, No. M13855, Oct. 13, 2006 (Oct. 13, 2006), XP030042523, ISSN: 0000-0233.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP, 97. MPEG Meeting; Jul. 18, 2011-Jul. 22, 2011; Torino; (Motion Picture Expert Group or ISO/IEC JTC1/SC29/WG11)" No. m21096, Jul. 21, 2011 (Jul. 21, 2011), XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011 (Jul. 22, 2011), XP030049998.
International Search Report and Written Opinion—PCT/US2012/053394—ISA/EPO—Feb. 6, 2013.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Li, M., et al., "Playout Buffer and Rate Optimization for Streaming over IEEE 802.11 Wireless Networks", Aug 2009, Worcester Polytechnic Institute, USA.
Luby et al., RaptorQ Forward Error Correction Scheme for Object Delivery draft-ietf-rmt-bb-fec-raptorq-00, Qualcomm, Inc. Jan. 28, 2010.
Michael G et al., "Improved low-density parity-check codes using irregular graphs", Information Theory, IEEE Transactions on, Feb. 2001, vol. 47, No. 2, pp. 585-598.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_to_BCAST_File_Delivery, Open Mobile Alliance (OMA), 4330 La Jolla Village Dr., Suite 110 San Diego, CA 92122; USA Oct. 2, 2007 (Oct. 2, 2007), pp. 1-13, XP064036903.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Roumy A., et al., "Unequal Erasure Protection and Object Bundle Protection with the Generalized Object Encoding Approach", Inria-00612583, Version 1, Jul. 29, 2011, 25 pages.
Schulzrinne, et al., "Real Time Streaming Protocol (RTSP)" Network Working Group, Request for Comments: 2326, Apr. 1998, pp. 1-92.
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011 (Jul. 24, 2011), XP030048903.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Wiegand, T., et al., "WD2: Working Draft 2 of High-Efficiency Video Coding", 20110128, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Anonymous: "Technologies under Consideration", 98. MPEG Meeting; Nov. 28, 2011-Feb. 12, 2011; Geneva; (Motion Picture Expert Group or ISO/IEC JTC1/SC29/WG11),, No. N12330, Dec. 3, 2011 (Dec. 3, 2011), XP030018825.
Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/WG11),, No. N12329, Jan. 6, 2012 (Jan. 6, 2012), XP030018824.
"Digital Video Broadcasting (DVB); Framing structure, channel coding and modulation for digital terrestrial television; ETSI EN 300 744" ETSI Standards, Lis, Sophia Antipolis Cedex, France, V1.6.1, pp. 9, Jan. 10, 2009 (Jan. 2009).
Kim J., et al., "Enhanced Adaptive Modulation and Coding Schemes Based on Multiple Channel Reportings for Wireless Multicast Systems", 62nd IEEE Vehicular Technology Conference, VTC-2005-Fall, Sep. 25-28, 2005, vol. 2, pp. 725-729, XP010878578, DOI: 1 0.1109/VETECF.2005.1558019, ISBN: 978-0-7803-9152-9.
Moriyama, S., "5. Present Situation of Terrestrial Digital Broadcasting in Europe and USA", Journal of the Institute of Image Information and Television Engineers, Nov. 20, 1999, vol. 53, No. 11, pp. 1476-1478.
Qualcomm Incorporated: "RaptorQ Technical Overview", pp. 1-12, Oct. 1, 2010.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Miller G., et al., "Bounds on the maximum likelihood decoding error probability of low density parity check codes", Information Theory, 2000. Proceedings. IEEE International Symposium on, 2000, p. 290.
Muramatsu J., et al., "Low density parity check matrices for coding of multiple access networks", Information Theory Workshop, 2003. Proceedings. 2003 IEEE, Apr. 4, 2003, pp. 304-307.
Samukawa, H. "Blocked Algorithm for LU Decomposition" Journal of the Information Processing Society of Japan, Mar. 15, 1993, vol. 34, No. 3, pp. 398-408.
3GPP, "Transparent end-to-end packet-switched streaming service (PSS): Protocols and codecs (Release 9)," 3GPP TS 26.234, version 9.1.0, Release 9, Sophia Antipolis, Valbonne, FR, 179 pp. Dec. 2009.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
Fielding et al., "Hypertext Transfer Protocol—HTTP/1.1," Network Working Group, RFC 2616, Jun. 1999, 165 pp.
Hitachi Ltd. et al., "High-Definition Multimedia Interface," Specification Version 1.4, Jun. 5, 2009, 425 pp.
International Standard ISO/IEC 14496-12, Information Technology—Coding of audio-visual objects—Part 12: ISO base media file format, Third Edition, Oct. 15, 2008, 120 pp.

(56) References Cited

OTHER PUBLICATIONS

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
Marpe et al., "The H.264/MPEG4 Advanced Video Coding Standard and its Applications," Standards Report, IEEE Communications Magazine, Aug. 2006, pp. 134-143.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T REC. H.222.0(May 2006)FPDAM 4, vol. MPEG2009, No. 10572, May 11, 2009 (May 11, 2009), pp. 1-20, XP002605067 p. 11, last two paragraphs sections 2.6.78 and 2.6.79 table T-1.
Stockhammer, WD 0.1 of 23001-6 Dynamic Adaptive Streaming over HTTP (DASH), MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun et al., "Seamless Switching of Scalable Video Bitstreams for Efficient Streaming," IEEE Transactions on Multimedia, vol. 6, No. 2, Apr. 2004, pp. 291-303.
Vetro et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.
Wenge et al., "Asymmetric Stereoscopic Video Encoding Algorithm Based on Joint Compensation Prediction," 2009 International Conference on Communications and Mobile Computing, 4 pp.
Gerard F., et al., "HTTP Streaming MPEG media—Response to CFP", 93. MPEG Meeting, Geneva Jul. 26, 2010 to Jul. 30, 2010.
3GPP TSG-SA4 #57 S4-100015, IMS based PSS and MBMS User Service extensions, Jan. 19, 2010, URL: http://www.3gpp.org/ftp/tsg_sa/WG4_CODEC/TSGS4_57/docs/S4-100015.zip.
3rd Generation Partnership Project; Technical Specification Group Services and System Aspects; Transparent end-to-end Packet-switched Streaming Service (PSS); Protocols and codecs(Release 9) 3GPP TS 26.234 V9.3.0, Jun. 23, 2010 P.85-102,URL,http://www.3gpp.org/ftp/TSG_SA/WG4_CODEC/TSGS4_59/Docs/S4-100511.zip, 26234-930.zip.
Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Luby M., "Simple Forward Error Correction (FEC) Schemes," draft-luby-rmt-bb-fec-supp-simple-00.txt, pp. 1-14, Jun. 2004.
Luby M. "LT Codes", Foundations of Computer Science, 2002, Proceedings, The 43rd Annual IEEE Symposium on, 2002.
Morioka S., "A Verification Methodology for Error Correction Circuits over Galois Fields", Tokyo Research Laboratory, IBM Japan Ltd, pp. 275-280, Apr. 22-23, 2002.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.
Chikara S., et al., "Add-on Download Scheme for Multicast Content Distribution Using LT Codes", IEICE. B, Communications, Aug. 1, 2006, J89-B (8), pp. 1379-1389.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, pp. 938-942, XP000525729, ISSN: 0018-9340, DOI: 10.1109/12.392853.
Tetsuo M., et al., "Comparison of Loss Resilient Ability between Multi-Stage and Reed-Solomon Coding ", Technical report of IEICE. CQ, Communication Quality, vol. 103 (178), Jul. 4, 2003, pp. 19-24.
Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.
Watson M., et al., "Raptor FEC Schemes for FECFRAME draft-ietf-fecframe-raptor-04," 2010, pp. 1-21, URL, http://tools.ietf.org/pdf/draft-ietf-fecframe-raptor-04.pdf.
Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.
Ramsey B, "HTTP Status: 206 Partial Content and Range Requests," May 5, 2008 obtained at http://benramsey.com/blog/2008/05/206-partial-content-and-range-requests/.
Call for Proposals on HTTP Streaming of MPEG Media, ISO/IEC JTC1/SC291VVG11 N11338, Apr. 2010, URL, http://www.3gpp.org/ftp/Inbox/LSs_from_external_bodies/ISO_IEC_JTCL_SG29_WG11/29n11262.zip, 29n112622.doc.
Chen Y.,et al.,"Low-Complexity Asymmetric Multiview Video Coding", Multimedia and Expo, 2008 IEEE International Conference on, Jun. 2008, pp. 773-776.
Fehn C., et al., "Asymmetric Coding of Stereoscopic Video for Transmission Over T-DMB", 3DTV Conference, May 2007, pp. 1-4.
ISO/IEC 14996-12 International Standard, "Information technology-Coding of audio-visual objects Part 12: ISO base media file format," Oct. 1, 2005, 94 pp.
Murata, H., et.al., "32.2: A Real-Time 2-D to 3-D Image Conversion Technique Using Computed Image Depth", 1998 SID International Symposium Digest of Technical Papers, vol. 29, Issue 1, May 1998, pp. 919-923, [online], Internet URL: http://radioskot.ru/_fr/2/2Dto3D_conv32_0.pdf.
Ono S., et al., "Ubiquitous Technology: High-Efficiency Coding of Moving Images—MEPG-4 and H.264—," 1st edition, Apr. 20, 2005, Ohmsha, Ltd., pp. 124, 125 and 134-136, ISBN: 4-274-20060-4.
Open IPTV Forum Release 2 Specification HTTP Adaptive Streaming Draft V0.04.01, Apr. 26, 2010, URL, http://www.3gpp.org/ftp/tsg_sa/WG4_CODEC/TSGS4_58/Docs/S4-100332.zip, OIPF-DR-HAS-v0_04_01-2010-04-23.pdf.
"Report on Research and Development for Image Production and Display Using Digital Techniques," Mar. 2008, Digital Content Association of Japan, pp. 60-66.
Sullivan G.J., et.al., "Draft AVC amendment text to specify Constrained Baseline profile, Stereo High profile, and frame packing SEI message", Jun. 28-Jul. 3, 2009, pp. 1-22, Joint Video Team (JVT) of ISO/IEC MPEG & ITU-TVCEG (ISO/IEC JTC1/SC29/WG11 and ITU-T SG16 Q.6), Document: JVT-AE204, Internet.
Wiegand T., et al., "Coding Efficiency Improvement for SVC Broadcast in the Context of the Emerging DVB Standardization", Proc. of 17th European Signal Processing Conf., Aug. 2009, URL, http://www.eurasip.org/Proceedings/Eusipco/Eusipco2009/contents/papers/1569192498.pdf.

* cited by examiner

SIGNALING DATA FOR MULTIPLEXING VIDEO COMPONENTS

This application claims the benefit of U.S. Provisional Application No. 61/364,747, filed Jul. 15, 2010, and U.S. Provisional Application No. 61/366,436, filed Jul. 21, 2010, both of which are hereby incorporated by reference in their respective entireties.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/ MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to macroblocks in other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28$^{th}$ JVT meeting, Hannover, Germany, July 2008, available at http://wftp3.itu.int/av-arch/jvt-site/2008_07_Hannover/ JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document integrates SVC and MVC into the AVC specification.

SUMMARY

In general, this disclosure describes techniques for transporting video data, e.g., via a network streaming protocol, such as hypertext transfer protocol (HTTP) streaming. In some cases, video content may include multiple possible combinations of audio and video data. For example, the content may have multiple possible audio tracks (e.g., in different languages such as English, Spanish, and French) and multiple possible video tracks (e.g., encoded with different coding parameters such as various bitrates, various frame rates, and/ or with other various characteristics). These tracks may be referred to as components, e.g., audio components and video components. Each combination of components may form a unique presentation of the multimedia content, and may be delivered to a client as a service. The techniques of this disclosure allow a server to signal characteristics of various representations, or multimedia components, in a single data structure. In this manner, a client device may retrieve the data structure and select one of the representations to request from the server, e.g., in accordance with a streaming network protocol.

In one example, a method of sending encapsulated video data includes sending characteristics for components of a plurality of representations of video content to a client device, wherein the characteristics comprise at least one of a frame rate, a profile indicator, a level indicator, dependencies between the components and number of target output views for a 3D representation, receiving a request from the client device for at least one of the components after sending the characteristics, and sending the requested components to the client device in response to the request.

In another example, an apparatus for sending encapsulated video data includes a processor configured to determine characteristics for components of a plurality of representations of video content, wherein the characteristics comprise at least one of a frame rate, a profile indicator, a level indicator, and dependencies between the components, and one or more interfaces configured to send the characteristics to a client device, receive a request from the client device for at least one of the components after sending the characteristics, and send the requested components to the client device in response to the request.

In another example, an apparatus for sending encapsulated video data includes means for sending characteristics for components of a plurality of representations of video content to a client device, wherein the characteristics comprise at least one of a frame rate, a profile indicator, a level indicator, and dependencies between the components, means for receiving a request from the client device for at least one of the components after sending the characteristics, and means for sending the requested components to the client device in response to the request.

In another example, a computer program product includes a computer-readable storage medium comprises instructions that, when executed, cause a processor of a source device for sending encapsulated video data to send characteristics for components of a plurality of representations of video content to a client device, wherein the characteristics comprise at least one of a frame rate, a profile indicator, a level indicator, and dependencies between the components, receive a request from the client device for at least one of the components after sending the characteristics, and send the requested components to the client device in response to the request.

In another example, a method of receiving encapsulated video data includes requesting characteristics for components of a plurality of representations of video content from a source device, wherein the characteristics comprise at least one of a frame rate, a profile indicator, a level indicator, and dependencies between the components, selecting one or more of the components based on the characteristics, requesting samples of the selected components, and decoding and presenting the samples after the samples have been received.

In another example, an apparatus for receiving encapsulated video data includes one or more interfaces configured to request characteristics for components of a plurality of representations of video content from a source device, wherein the characteristics comprise at least one of a frame rate, a profile indicator, a level indicator, and dependencies between the components, and a processor configured to select one or more of the components based on the characteristics, and to cause the one or more interfaces to submit requests for samples of the selected components to the source device.

In another example, an apparatus for receiving encapsulated video data includes means for requesting characteristics for components of a plurality of representations of video content from a source device, wherein the characteristics comprise at least one of a frame rate, a profile indicator, a level indicator, and dependencies between the components, means for selecting one or more of the components based on the characteristics, means for requesting samples of the selected components, and means for decoding and presenting the samples after the samples have been received.

In another example, a computer program product includes a computer-readable storage medium comprises instructions that cause a processor of a device for receiving encapsulated video data to request characteristics for components of a plurality of representations of video content from a source device, wherein the characteristics comprise at least one of a frame rate, a profile indicator, a level indicator, and dependencies between the components, select one or more of the components based on the characteristics, request samples of the selected components, and decode and present the samples after the samples have been received.

The details of one or more examples are set forth in the accompanying drawings and the description below. Other features, objects, and advantages will be apparent from the description and drawings, and from the claims.

DETAILED DESCRIPTION

Figure 1:
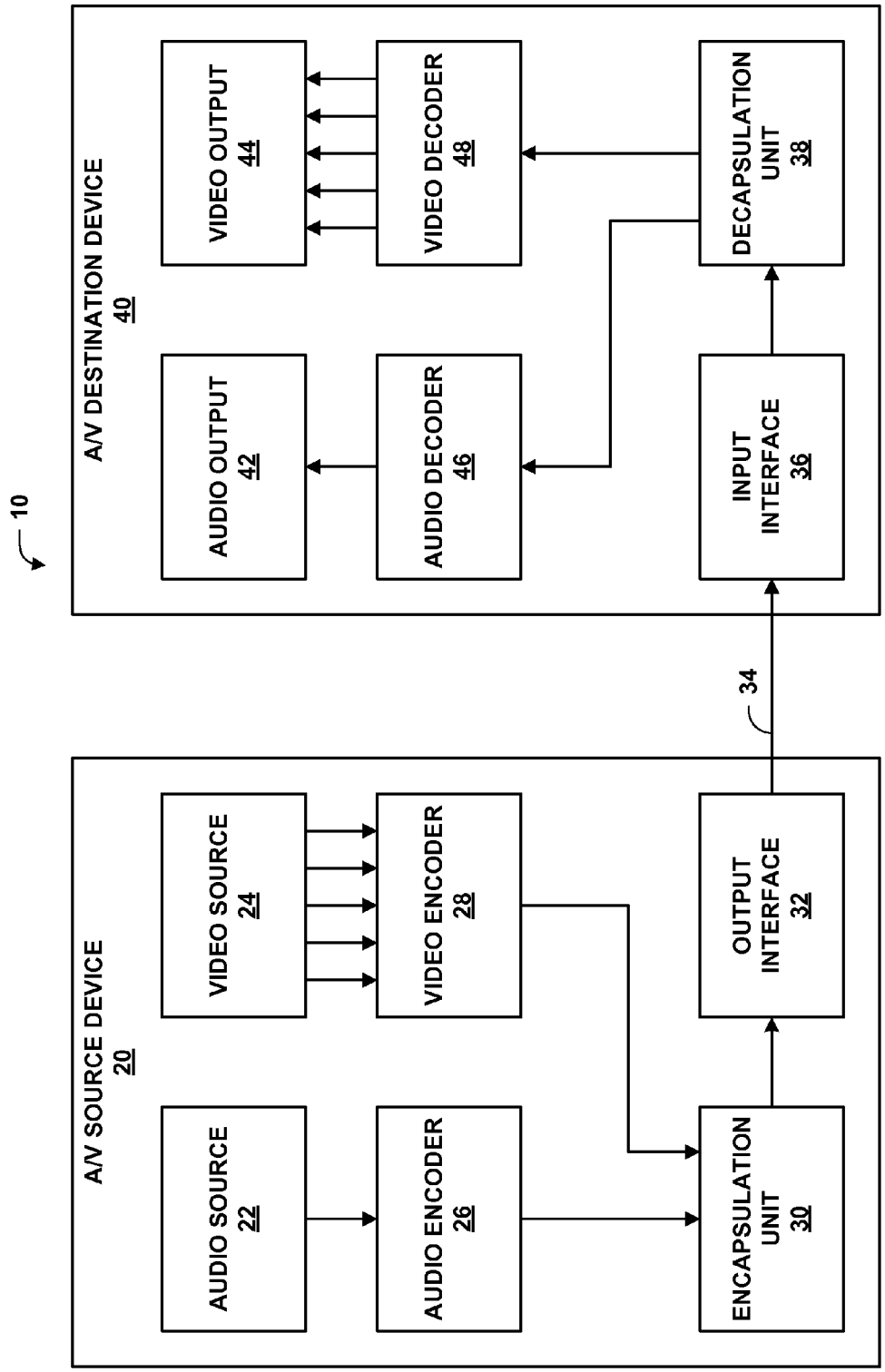
FIG. 1 is a block diagram illustrating an example system in which an audio/video (A/V) source device transfers audio and video data to an A/V destination device.

In general, this disclosure describes techniques for transporting video content. The techniques of this disclosure include transporting video content using a streaming protocol, such as hypertext transfer protocol (HTTP) streaming. Although HTTP is described for purposes of illustration, the techniques presented in this disclosure may be useful with other types of streaming. The video content may be encapsulated in video files of a particular file format, such as ISO Base Media File Format or its extensions. A video content may be also encapsulated with MPEG-2 Transport Stream. A content server may provide a multimedia service including different types of media data (e.g., audio and video), and various sets of data for each type (e.g., different languages such as English, Spanish, and German audio and/or different encoding types for video such as MPEG-2, MPEG-4, H.264/AVC, or H.265). The techniques of this disclosure may be particularly useful for signaling how various types and sets of data of each type can be combined and multiplexed.

This disclosure refers to a collection of related multimedia data of a scene as "content," which may contain multiple video and/or audio content components. The term "content component" or simply "component" refers to media of a single type, e.g., video or audio data. A component of data may refer to a track of data, a sub-track, or a collection of tracks or sub-tracks. In general, a "track" may correspond to a sequence of related encoded picture samples, while a sub-track may correspond to a subset of the encoded samples of a track. As an example, a content component may correspond to a video track, an audio track, or movie subtitles. An HTTP streaming server may deliver a set of content components to a client as a service to the client.

A service may correspond to a selection of one video content component from all video content components available for the content and a selection of one audio content component from all audio content components available for the content. For example, a football match program, as a content stored in a HTTP server, may have multiple video content components, e.g., with different bitrates (512 kbps or 1 Mbps) or with different frame rates, and multiple audio components, e.g., English, Spanish, or Chinese. Thus, a service provided to the client may correspond to a selection of one video component and one audio component, e.g., Spanish audio with the 512 kbps video. A combination of video and audio components may also be referred to as a representation of the content.

In HTTP streaming, as an example, a client device generates one or more requests for data in the form of HTTP Get requests or partial Get requests. An HTTP Get request specifies a uniform resource locator (URL) or uniform resource name (URN) of a file. An HTTP partial Get request specifies a URL or URN of a file, as well as a byte range of the file to retrieve. An HTTP streaming server may respond to an HTTP Get request by outputting (e.g., sending) the file at the requested URL or URN, or the requested byte range of the file in the case of an HTTP partial Get request. In order for a client to properly generate HTTP Get and partial Get requests, the server may provide information regarding the URLs and/or URNs of files corresponding to content components to the client, as well as characteristics of the components, such that the client can select desired content components and properly generate HTTP Get and/or partial Get requests for the components.

The techniques of this disclosure include signaling characteristics of content components, e.g., signaling locations of data for various content components. In this manner, a client device may select a representation of the content and generate requests for combinations of various types of content components. For example, in accordance with the example above, a user may elect to view the 512 kbps video with Spanish audio. The viewer's client device may submit a request for these two components. That is, the client device may determine locations for data of the 512 kbps video and Spanish audio using the signaled data from the server, and then generate requests for the data corresponding to these content components. In response to the request, a server may deliver these two components as a service to the client device.

The ISO Base Media File Format is designed to contain timed media information for a representation in a flexible, extensible format that facilitates interchange, management, editing, and representation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual representations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a representation is contained in one file, and the media representation is self-contained. The movie container (movie box) may contain the metadata of the media and the video and audio frames may be contained in the media data container and could be in other files.

In accordance with the techniques of this disclosure, a server may provide a component map box that signals characteristics of various content components. The component map box may correspond to a data structure that may be stored in a file separate from files storing encoded samples for the various content components. The component map box may signal characteristics of a content component that are not conventionally signaled for video data in a data structure stored external to the files that actually include the coded video samples. Such a data structure, as in the component map box, may be also signaled in the manifest file or Media Presentation Description of HTTP streaming.

The characteristics may include, for example, a frame rate, a profile indicator, a level indicator, and dependencies between the components. The characteristics signaled by the component map box may also include three-dimensional characteristics for 3D video, such as a number of views and relationships between the views (e.g., two views that form a stereo pair). The component map box may signal these characteristics in addition to conventionally signaled characteristics for a content component, such as a bitrate and resolution for the content component. The component map box may also provide a service identifier (e.g., content_id value) that uniquely identifies a service of the content. Each component of the service may be associated with the service identifier.

A source device may be configured to provide a component map box for video content regardless of how the content is encapsulated. That is, the source device may provide the component map box to client devices regardless of whether the video content is encapsulated according to the Advanced Video Coding (AVC) file format, the Scalable Video Coding (SVC) file format, the Multiview Video Coding (MVC) file format, the Third Generation Partnership Project (3GPP) file format, or other file formats. A component map box may signal characteristics of content components for a particular content. In some examples, each component may correspond to a video or audio track of a file, a track in a series of small files, track fragments, combinations of tracks (e.g., in SVC or MVC), or a subset of a track.

In general, the component map box may be stored separately from the video data it describes. In some examples, the component map box may be included in a separate file or be included as part of one movie file including content components, e.g., an mp4 or 3GP file, or other file supporting the functionality described in this disclosure. The location of the component map box may vary by encapsulating file type. Moreover, the component map box may be made an extension to the ISO base media file format or one or more of its extensions. Such a data structure, as in the component map box may be also signaled in the manifest file or Media Presentation Description of HTTP streaming.

By default, a component map box may be applicable to the whole duration of associated content. However, in some cases, a component map box may only apply to a particular timing interval of the content. In such cases, a server may provide multiple component map boxes, and signal for each the timing interval to which the component map box corresponds. In some examples, when a server provides multiple component map boxes, the server may be configured in a static mode, in which the component map boxes are arranged contiguously in timing interval order in the same file. In some examples, the server may be configured in a dynamic mode, in which the component map boxes may be provided in separate files and/or in discontinuous locations from each other. The dynamic mode may provide advantages for live streaming, while the static mode may provide advantages with respect to seeking in a larger time range.

This disclosure also provides a component arrangement box that may be included within each file to signal relationships between tracks of the file and various components. For example, a component arrangement box in a file including data for two or more tracks may signal a relationship between track identifiers for tracks in the file and component identifiers for corresponding content components. In this manner, a client device may first retrieve the component map box from a server device. The client device may then select one or more components of a representation based on characteristics signaled by the component map box. Then, the client device may retrieve component arrangement boxes from files storing the components described by the component map box. Using the component map box, which may include segment information such as byte ranges of fragments for a particular component, the client may determine where fragments of the selected components are stored in the files. Based on this determination, the client may submit requests (e.g., HTTP Get or partial Get requests) for fragments of the tracks or sub-tracks corresponding to the selected components.

In this manner, rather than signaling information on how each file or each track is associated with a content component in the component map box, this information may be stored in component arrangement boxes associated with respective files. The component map box may signal component identifiers (e.g., component_id values) of all components of a content, while the component arrangement box may signal relationships between component_id values of components stored within the file corresponding to the component arrangement box and content_id values associated with the component_id values. The component map box may also, in some cases, store segment information. Further, the component map box may include a flag indicating whether the component map box includes segment information. A client device may be configured to assume that, if the component map box does not include segment information, the media data of the representation are contained in dependent representations.

The server may assign unique component_id values to each type of media, ensuring that the component_id value is unique for any video or audio component in the same service. Components of a particular type may be switchable to each other. That is, a client may switch between various video components, e.g., in response to changing network conditions or other factors. A client need not request components of each available type. For example, a client may omit requesting captions for a content including closed caption components. Moreover, in some cases, multiple components of the same media type may be requested, e.g., to support 3D video or picture in picture. The server may provide additional signaling to support specific functionalities such as picture in picture.

For example, the server may provide a flag indicative of whether a component includes a description of picture in picture data. If the flag indicates that the component includes picture in picture data, the component map box may provide an identifier of a representation, together with a current representation, that are to be shown together to form a picture in picture display. One representation may correspond to the large picture, while the other representation may correspond to the smaller picture overlaid with the large picture.

As noted above, the server may provide a component arrangement box in each file including encoded samples corresponding to one or more components. The component arrangement box may be provided in header data of the file. The component arrangement box may indicate components included in the file and how the components are stored, e.g., as tracks within the file. The component arrangement box may provide a mapping between a component identifier value and track identifier values of the corresponding track in the file.

The component map box may also signal dependencies between content components, where the signaled dependencies may include the order of dependencies together with current content component for a decoding order of the content components inside an access unit. Signaled information regarding dependencies for a current representation may include either or both of representations dependant on the current representation and/or representations on which the current representation depends. There may also be dependencies between content components in the temporal dimension. However, simply indicating temporal_id values for each video component might not be sufficient, since the temporal sub layers in totally independent alternative video bitstreams do not necessarily have a mapping of frame rates to each other. For example, one video component may have a frame rate of 24 fps and a temporal_id equal to 0, and may have a sub-layer of 12 fps (assuming two temporal layers), while another video component may have a frame rate of 30 fps, with a temporal_id equal to 0, and may have a sub layer of 7.5 fps (assuming three temporal layers). The server may therefore indicate the temporal layer difference when the dependency of two video components is signaled.

In general, signaled characteristics of a component may include, for example, an average bitrate, a maximum bitrate (e.g., over one second), resolution, frame rate, dependency to other components, and/or reserved extensions, e.g., for multiview video, which may include the number of views targeted for output and identifiers for those views. Information regarding a series of media fragments forming a content component may also be signaled. Signaled information for each media fragment may include the byte offset of the media fragment, decoding time of the first sample in the media fragment, a random access point in the fragment and its decoding time and representation time, and/or a flag to indicate whether the fragment belongs to a new segment (and thus a different URL) of the content component.

In some cases, fragments of audio data are not temporally aligned with fragments of video data. This disclosure provides techniques for multiplexing multiple content components based on a particular time interval. The component map box may provide a list of supported multiplexing intervals, or a range of multiplexing intervals. The multiplexing interval may be designated as T, and may represent a temporal length of multiplexed audio and video data. Suppose that the next time interval to be requested is $[n*T, (n+1)*T]$. The client device may determine whether there is some fragment in each content component having a starting time t such that $(n*T) <=t<=((n+1)*T)$. If so, the client device may request that fragment. Fragments starting before $n*T$ may be requested before the current multiplexing interval $n*T$, while fragments starting after interval $(n+1)*T$ may be requested at a later multiplexing interval. In this manner, content components that do not have fragment boundaries that align with each other or with a requested multiplexing interval may nevertheless be multiplexed. Moreover, the multiplexing interval may change during a service without preventing multiplexing of the content components.

The client device may be configured to adapt to changing network conditions by changing the multiplexing interval. For example, when bandwidth becomes relatively more available, the client device may increase the multiplexing interval. On the other hand, when bandwidth becomes relatively less available, the client device may decrease the multiplexing interval. The client device may further be configured to request multiplexed fragments based on a certain timing interval and instantaneous bitrate. The client device may calculate the instantaneous bitrate based on the number of bytes in a fragment and the temporal duration of the fragment.

The server may, in some examples, assign the same component identifier to two continuous media representations, e.g., two video files having sequential timing information, to support temporal splicing. As noted above, in some cases, representations may include content components stored in different files. Accordingly, a client device may need to submit multiple Get or partial Get requests to retrieve data for a particular time interval of the content. That is, the client may need to submit multiple Get or partial Get requests referring to the various files storing the content components for the representation. When multiple requests are needed to get data to be multiplexed in a certain time interval, the client device may pipeline the requests to ensure that no data in another time interval is received between the desired media fragment data in the current time interval.

In this manner, media content having components in multiple files can be supported in a network streaming context, such as HTTP Streaming. That is, a representation of the media content may include one component in one file and another component in a separate file. A server may signal characteristics of the components in different files in a single data structure, e.g., a component map box. This may enable a client to make requests for any target content component, or for any duration of a target content component.

The use of data structures similar to the component map box and component arrangement box of this disclosure may also provide other advantages. For example, two media tracks in different components may have the same track identifier (track_id) value within the respective components. However, as noted above, the component map box may refer to separate components using a component identifier, which is not the same as a track identifier value. Because each file may include a component arrangement box that maps component identifiers to track identifiers, the component map box may refer to components using a component identifier that is independent of the track identifier value. The component arrangement box may also provide an efficient mechanism for specifying which file corresponds to which content, e.g., when a content delivery network (CDN) server stores multiple files corresponding to many different contents.

Furthermore, the techniques of this disclosure may support clients with different network buffer sizes. That is, some clients may require differently sized buffers than others, e.g., due to network conditions, client capabilities, and the like. Therefore, in some cases, multiple types of components for a particular representation may need to be multiplexed at different time intervals. This disclosure provides techniques for a server to signal different possible multiplexing time intervals, and therefore account for variations in sizes of requested data and, thus, performance of transmission, e.g., in terms of round trip time between a client and server using HTTP.

Moreover, in some cases, a content component in one file may depend on several other content components in one or more other files. Such a dependency may occur within an access unit. As an example, a video content component may correspond to a common interface format (CIF) SVC enhancement layer that depends on a CIF layer and a quarter common interface format (QCIF) layer. Both the CIF and QCIF layers may be in one file, wile the 4CIF enhancement layer may be another file. The techniques of this disclosure may ensure that a client is able to properly request data for the CIF, QCIF, and 4CIF layers, such that a decoder of the client receives samples from these layers in a proper decoding order, based on the dependencies.

In some examples, a dynamic server may be used to dynamically create files that multiplex content components together. For example, a dynamic server may support methods following Common Gateway Interface (CGI) service to multiplex components together, and make the data for a current time interval a continuous part of a dynamic file. CGI is described in Request for Comment 3875, available at http://tools.ietf.org/html/rfc3875. Using a service such as CGI, the server may dynamically generate a file including a combination of various content components for a representation of content.

A representation (motion sequence) may be contained in several files. Timing and framing (position and size) information is generally in the ISO base media file and the ancillary files may essentially use any format. This representation may be 'local' to the system containing the representation, or may be provided via a network or other stream delivery mechanism.

The files may have a logical structure, a time structure, and a physical structure, and these structures are not required to be coupled. The logical structure of the file may be of a movie or video clip (potentially including both video and audio data) that in turn contains a set of time-parallel tracks. The time structure of the file may be that the tracks contain sequences of samples in time, and those sequences are mapped into the timeline of the overall movie by optional edit lists. The physical structure of the file may separate the data needed for logical, time, and structural de-composition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, and synchronized as desired with the media data it is describing. Secondly, there may be general support for non-timed meta-data attached to the movie or to an individual track. The structural support is general, and allows the storage of meta-data resources elsewhere in the file or in another file, in a manner similar to the storage of the media data, that is, the coded video pictures. In addition, these resources may be named, and may be protected.

The term "progressive download" is used to describe the transfer of digital media files from a server to a client, typically using the HTTP protocol. When initiated from a computer, the computer may begin playback of the media before the download is complete. One difference between streaming media and progressive download is in how the digital media data is received and stored by the end user device that is accessing the digital media. A media player that is capable of progressive download playback relies on metadata located in the header of the file to be intact and a local buffer of the digital media file as it is downloaded from a web server. At the point at which a specified amount of buffered data becomes available to the local playback device, the device may begin to play the media. This specified amount of buffered data may be embedded into the file by the producer of the content in the encoder settings and may be reinforced by additional buffer settings imposed by the media player of the client computer.

In progressive downloading or HTTP streaming, instead of providing a single movie box (moov box) that includes all media data, including video and audio samples, movie fragments (moof) are supported to contain extra samples besides those contained in the movie box. Typically, movie fragments contain the samples for a certain period of time. Using the movie fragments, a client can quickly seek to a desired time. A movie fragment may contain continuous bytes of a file, so that in accordance with a streaming protocol, such as HTTP streaming, a client may issue a partial-GET request to retrieve a movie fragment.

With respect to 3GPP as an example, HTTP/TCP/IP transport is supported for 3GPP files for download and progressive download. Furthermore, using HTTP for video streaming may provide some advantages, and the video streaming services based on HTTP are becoming popular. HTTP streaming may provide certain advantages, including that existing Internet components and protocols may be used, such that new efforts are not needed to develop new techniques for transporting video data over a network. Other transport protocols, e.g., real time protocol (RTP) payload format, require intermediate network devices, e.g., middle boxes, to be aware of the media format and the signaling context. Also, HTTP streaming can be client-driven, which may avoid control issues. Using HTTP also does not necessarily require new hardware or software implementations at a Web server that has HTTP 1.1 implemented. HTTP streaming also provides TCP-friendliness and firewall traversal. In HTTP streaming, a media representation may be a structured collection of data that is accessible to the client. The client may request and download media data information to present a streaming service to a user.

A service is experienced by the user of a client as a representation of a movie, which is decoded and rendered by the client from the content components delivered by the server. In HTTP streaming, instead of receiving a full content in response to one request, the client can request segments of the content components. In this manner, HTTP streaming may provide for more flexible delivery of content. A segment may include a set of continuous movie fragment which could be requested by one URL. For example, a segment can be a whole small file, which may contain video and audio. As another example, a segment may correspond to one movie fragment, which may contain one video track fragment and one audio track fragment. As still another example, a segment may correspond to several movie fragments, any or all of which may have one video fragment and one audio fragment, and the movie fragments may be continuous in decoding time.

A content delivery network (CDN), also referred to as a content distribution network, may include a system of computers containing copies of data, placed at various points in the network so as to maximize bandwidth for access to the data by clients throughout the network. A client may access a copy of the data near the client, as opposed to all clients accessing the same central server, which may avoid bottlenecks near an individual server. Content types may include web objects, downloadable objects (media files, software, documents, and the like), applications, real time media streams, and other components of internet delivery (DNS, routes, and database queries). There are many successful CDNs that only rely on HTTP protocol, more specifically, origin server, proxies and caches based on HTTP 1.1.

In HTTP streaming, frequently used operations include GET and partial GET. The GET operation retrieves a whole file associated with a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. A movie fragment may contain several track fragments from different tracks.

In the context of HTTP Streaming, a segment may be delivered as a response to a GET request or a partial GET request (in HTTP 1.1). In a CDN, computing devices such as proxies and caches can store the segments in response to the requests. Thus, if the segment is requested by another client (or the same client), and the client has a path through this proxy device, the proxy device can deliver the local copy of the segment to the client, without retrieving the segment from the origin server again. In HTTP streaming, if the proxy device supports HTTP 1.1, byte ranges, as responses to requests, can be combined while stored in the cache of a proxy device or extracted while being used as a local copy of a response to a request. Each content component may include sections of continuous fragments, each of which can be requested by a HTTP GET or partial get sent by a client device. Such a fragment of a content component may be referred to as a media fragment.

There may be more than one media representations in HTTP streaming, to support various bitrates and various devices, as well as to adapt to various user preferences. A description of the representations can be described in a Media Presentation Description (MPD) data structure, which may correspond to a component map box, as generated by a server and sent to a client. That is, a conventional MPD data structure may include data corresponding to the component map box, as described in this disclosure. In other examples, the component map box may further include data similar to an MPD data structure, in addition to the data described in this disclosure with respect to the component map box. The described representations may include content components, contained in one or more movie files. If static content server is used, the server may store the movie files. If dynamic content server is supported, the server may generate a dynamic file (content) in response to a received request. Although dynamic content may be generated on the fly by a server, it is transparent to computing devices such as proxies and caches. Thus, the segments provided in response to the requests for dynamic content server can also be cached. A dynamic content server may have a more complex implementation and might be less storage optimal at the server side or less cache efficient during the delivery of the content.

In addition, this disclosure also includes techniques for signaling in the MPD whether a particular representation (e.g., a combination of components) is a complete operation point. That is, a server may provide a flag in the MPD to indicate to the client whether a representation can be selected as a complete video operation point. An operation point may correspond to an MVC sub-bitstream, that is, a subset of an MVC bitstream comprising a subset of views at a certain temporal level and representing a valid bitstream unto itself. An operation point may represent a certain level of temporal and view scalability and contain only NAL units required for a valid bitstream to represent a certain subset of views at a certain temporal level. An operation point may be described by view identifier values of the subset of views, and a highest temporal identifier of the subset of views.

The MPD may also describe individual representations for a multimedia content. For example, for each representation, the MPD may signal a representation identifier, a default attribute representation identifier, a profile and level indicator for the representation, a frame rate for the representation, a dependency group identifier, and a temporal identifier. The representation identifier may provide a unique identifier of the associated representation for the multimedia content. The default attribute representation identifier may provide an identifier of a representation having attributes that will be used as default attributes for the current representation, which may include any or all of a profile and level indicator, bandwidth, width, height, frame rate, dependency group identifier, temporal identifier, and/or a frame packing type for 3D video. The frame rate identifier may specify a frame rate of the video component(s) for the corresponding representation. The dependency group identifier may specify the dependency group to which the corresponding representation is assigned. Representations in a dependency group having a temporal identifier value may depend on representations in the same dependency group with lower temporal identifier values.

For 3D video representations, e.g., corresponding to multiview video, the component map box may describe a number of target views for output. That is, the component map box may include a value representative of the number of target output views for a representation. In some examples, the component map box may provide depth information for a single view along with coded samples for the single view, such that a client device may construct a second view from the single view and the depth information. A flag may be present to indicate that the representation is a view plus depth representation. In some examples, multiple views may be contained in the representation, each being associated with depth information. In this manner, each of the views can be used as a basis for creating a stereo view pair, resulting in two views for each of the views of the representation. Thus, although multiple views may be contained in the representation, no two of the views necessarily form a stereo view pair. In some examples, a flag may be included to indicate whether a representation is only a dependant representation, which cannot by itself form a valid representation for the corresponding multimedia content.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data. Moreover, the techniques may be applied to computer-generated audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. In particular, encapsulation unit 30 may generate a component map box for a multimedia content, as well as component arrangement boxes for each file corresponding to the multimedia content. In some examples, a processor may execute instructions corresponding to encapsulation unit 30. That is, instructions to perform the functionality attributed to encapsulation unit 30 may be stored on a computer-readable medium and executed by a processor. Other processing circuitry may be configured to perform the functions attributed to encapsulation unit 30 as well, in other examples. The component map box may be stored separately from the components (e.g., audio components, video components, or other components) of the content.

Accordingly, destination device 40 may request the component map box for the multimedia content. Destination device 40 may use the component map box to determine components to request to perform playback of the content based on preferences of a user, network conditions, decoding and rendering capabilities of destination device 40, or other factors.

A/V source device 20 may provide a "service" to A/V destination device 40. A service generally corresponds to a combination of one or more audio and video content components, where the audio and video content components are subsets of the available content components of a full content. One service may correspond to stereo video having two views, while another service may correspond to four views, and still another service may correspond to eight views. In general, a service corresponds to source device 20 providing a combination (that is, a subset) of the available content components. A combination of content components is also referred to as a representation of the content.

Encapsulation unit 30 receives encoded samples from audio encoder 26 and video encoder 28 and forms corresponding network abstraction layer (NAL) units from the encoded samples, which may take the form of packetized elementary stream (PES) packets. In the example of H.264/

AVC (Advanced Video Coding), coded video segments are organized into NAL units, which provide a "network-friendly" video representation addressing applications such as video telephony, storage, broadcast, or streaming. NAL units can be categorized as Video Coding Layer (VCL) NAL units and non-VCL NAL units. VCL units may contain data from the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

In accordance with the techniques of this disclosure, encapsulation unit 30 may construct a component map box that describes characteristics of content components. Encapsulation unit 30 may also construct component arrangement boxes for one or more video files. Encapsulation unit 30 may associate each component arrangement box with a corresponding video file, and may associate a component map box with a set of video files. In this manner, there may be a 1:1 correspondence between component arrangement boxes and video files, and a 1:N correspondence between component map boxes and video files.

As noted above, the component map box may describe characteristics of components common to a content. For example, the content may include audio components, video components, and other components, such as closed captioning. Each of the components of a certain type may be switchable to each other. For example, two video components may be switchable, in that data from either of the two components may be retrieved without impeding playback of the content. The various components may be encoded in various ways and with various qualities. For example, various video components may be encoded at various frame rates, bitrates, using different encoders (e.g., corresponding to different codecs), encapsulated in various file types (e.g., H.264/AVC or MPEG-2 transport stream (TS)) or otherwise differ from each other. However, the selection of a video component is generally independent of selection of an audio component, for example. The characteristics of a component signaled by the component map box may include an average bitrate, a maximum bitrate (e.g., over one second of playback time for the component), a resolution, a frame rate, dependencies to other components, and extensions for various file types, such as multi-view video, e.g., the number of views targeted for output and identifiers for each of the views.

Source device 20, which may act as a server such as an HTTP server, may store multiple representations of the same content for adaptation. Some representations may contain multiple content components. The components may be stored in different files on a storage device of source device 20 (e.g., one or more hard drives), and thus a representation may include data from different files. By signaling the characteristics of the various components, encapsulation unit 30 may provide destination device 40 with the ability to select one of each switchable component to render and playback the corresponding content. That is, destination device 40 may retrieve the component map box from source device 20 for a particular content, select components for the content corresponding to a particular representation of the content, then retrieve data for the selected components from source device 20, e.g., in accordance with a streaming protocol such as HTTP streaming.

Destination device 40 may select a representation based on network conditions, such as available bandwidth, and characteristics of the components. Moreover, destination device 40 may adapt to changing network conditions using the data signaled by source device 20. That is, because components of the same type are switchable to each other, when network conditions change, destination device 40 may select a different component of a particular type that is more suitable for the newly determined network conditions.

Encapsulation unit 30 assigns component identifier values to each component of a multimedia content. The component identifier values are unique to the components, regardless of type. That is, there should not be an audio component and a video component having the same component identifier, for example. The component identifiers are also not necessarily related to track identifiers within individual files. For example, the content may have two video components, each stored in different files. Each of the files may identify the video components using the same track identifier, as identifiers local to a particular file are specific to the scope of that file, not externally. However, as the techniques of this disclosure involve providing characteristics of components that may reside within multiple files, this disclosure proposes uniquely assigning component identifiers that are not necessarily related to the track identifiers.

The component map box may also indicate how fragments are stored for each component/track in the file, e.g., where the fragments begin, whether they include random access points (and whether the random access points are instantaneous decoding refresh (IDR) or open decoding refresh (ODR) pictures), byte offsets to the beginning of each fragment, decoding times of the first samples in each fragment, decoding and presentation times for random access points, and a flag to indicate whether a particular fragment belongs to a new segment. Each segment may be independently retrievable. For example, encapsulation unit 30 may store each segment of a component such that each segment can be retrieved using a unique uniform resource locator (URL) or uniform resource name (URN).

Moreover, encapsulation unit 30 may provide component arrangement boxes in each of the files that provides a mapping between component identifiers for the content and track identifiers within the corresponding file. Encapsulation unit 30 may also signal dependencies between components of the same type. For example, certain components may be dependent on other components of the same type to be decoded correctly. As one example, in scalable video coding (SVC), a base layer may correspond to one component, and an enhancement layer for the base layer may correspond to another component. As another example, in multi-view video coding (MVC), one view may correspond to one component, and another view of the same scene may correspond to another component. As still another example, samples of one component may be encoded relative to samples of another component. For example, in MVC, there may be components corresponding to different views for which inter-view prediction is enabled.

In this manner, destination device 40 may determine dependencies between the components and retrieve parent components for components depending from the parent components, in addition to the desired components, in order to properly decode and/or render the components. Encapsulation unit 30 may further signal an ordering of the dependencies and/or a decoding order of the components, so that destination device 40 can request data for the components in the proper order. Furthermore, encapsulation unit 30 may signal temporal layer differences between components having dependencies, so that destination device 40 can properly align samples of the components for decoding and/or rendering. For example, one video component may have a frame rate of 24 and a temporal_id equal to 0 sub layer of 12 fps, while another video component may have a frame rate of 30 and a temporal_id equal to 0 sub layer of 7.5 fps.

Encapsulation unit 30 may signal various possible multiplexing intervals for combinations of components to form a representation. In this manner, destination device 40 may select one of the possible multiplexing intervals, in order to request data for the various components within a sufficient period of time to allow data for upcoming segments of the components to be retrieved while previous segments of the components are being decoded and displayed. That is, destination device 40 may request data for the components far enough in advance such that there is not an interrupted playback (assuming no immediate change in network conditions), yet not so much in advance that a buffer is overflowed. If there is a change in network conditions, destination device 40 may select a different multiplexing interval, rather than switching components entirely, to ensure that a sufficient amount of data is retrieved for decoding and rendering while awaiting transmission of more subsequent data. Encapsulation unit 30 may signal the multiplexing intervals based on explicitly signaled intervals or a range of intervals, and may signal these multiplexing intervals within the component map box.

In some examples, source device 20 may receive requests specifying multiple byte ranges. That is, destination device 40 may specify multiple byte-ranges in one request to achieve multiplexing of various components within a file. Destination device 40 may send multiple requests when components are in multiple files, any or all of which may specify one or more byte ranges. As an example, destination device 40 may submit multiple HTTP Get or partial Get requests to multiple URLs or URNs, where any or all of the partial Get requests may specify multiple byte ranges within the URLs or URNs of the requests. Source device 20 may respond by providing the requested data to destination device 40. In some examples, source device 20 may support dynamic multiplexing, e.g., by implementing Common Gateway Interface (CGI) to multiplex components of a representation together to dynamically form a file, which source device 20 may then provide to destination device 40.

Encapsulation unit 30 may also specify a temporal duration of the content to which a component map box corresponds. By default, destination device 40 may be configured to determine that a component map box applies to an entire content when no temporal duration is signaled. However, where signaled, destination device 40 may be configured to request multiple component map boxes for the content, each corresponding to a different temporal duration of the content. Encapsulation unit 30 may store the component map boxes together contiguously, or in separate locations.

In some cases, various portions (e.g., segments) of a component may be stored in separate files (e.g., URL or URN retrievable data structures). In such cases, the same component identifier may be used to identify the component in each file, such as within a component arrangement box of the file. The files may have sequential timing information, that is, timing information that indicates one of the files immediately follows the other file. Destination device 40 may generate requests for multiplexed fragments based on a certain timing interval and an instantaneous bitrate. Destination device 40 may calculate the instantaneous bitrate based on a number of bytes in fragments of a component.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

A media representation may include a media representation description (MPD), which may contain descriptions of different alternative representations (e.g., video services with different qualities) and the description may include, e.g., codec information, a profile value, and a level value. Destination device 40 may retrieve the MPD of a media representation to determine how to access movie fragments of various representations. Movie fragments may be located in movie fragment boxes (moof boxes) of video files.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference pictures, respectively. Their combination may be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise any combination of one or more integrated circuits, microprocessors, and/or a wireless communication device, such as a cellular telephone.

After encapsulation unit 30 has assembled a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium. Output interface 32 may implement HTTP 1.1 to respond to HTTP Get and partial Get requests. In this manner, source device 20 may act as an HTTP streaming server.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the data to decapsulation unit 38. Decapsulation unit 38 may decapsulate elements of a video file to retrieve encoded data and send the encoded data to either audio decoder 46 or video decoder 48, depending on whether the encoded data is part of an audio or video component. Audio decoder 46 decodes encoded audio data and sends the decoded audio data to audio output 42, while video decoder 48 decodes encoded video data and sends the decoded video data, which may include a plurality of views, to video output 44.

Figure 2:
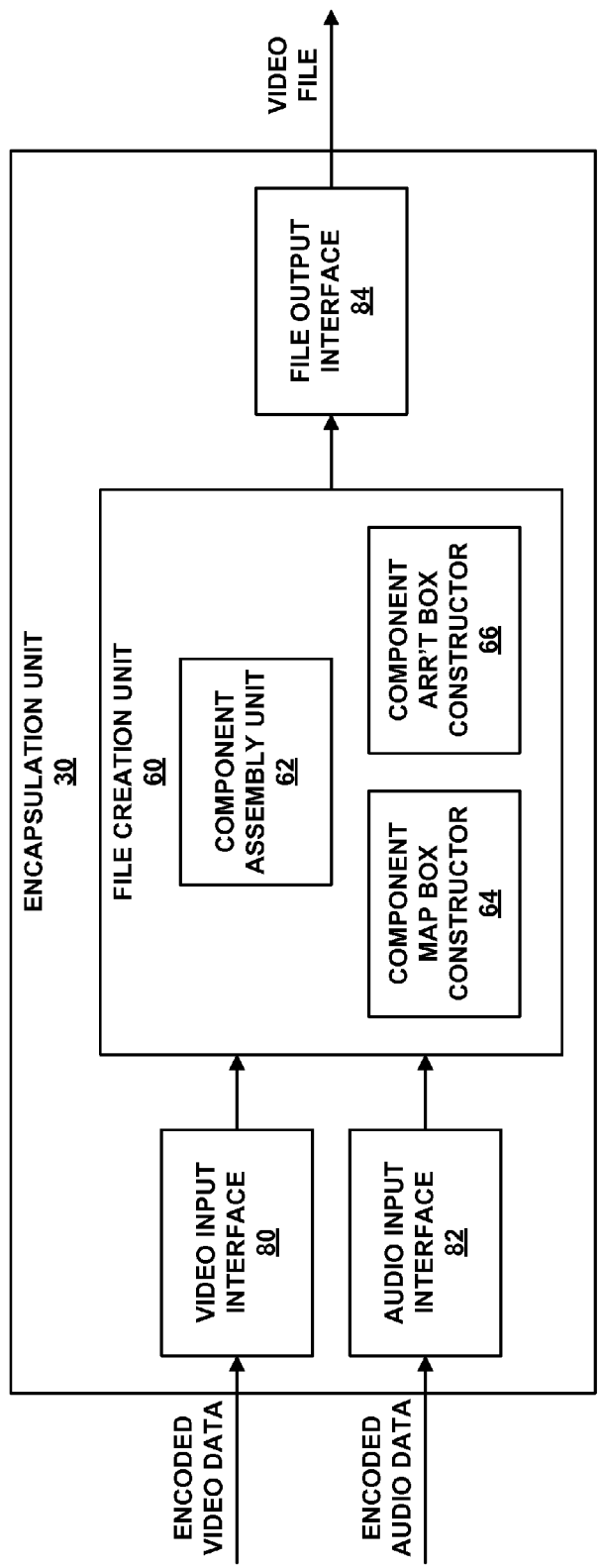
FIG. 2 is a block diagram illustrating components of an example encapsulation unit suitable for use in the A/V source device shown in FIG. 1.

FIG. 2 is a block diagram illustrating components of an example encapsulation unit 30. In the example of FIG. 2, encapsulation unit 30 includes video input interface 80, audio input interface 82, file creation unit 60, and video file output interface 84. File creation unit 60, in this example, includes component assembly unit 62, component map box constructor 64, and component arrangement (arr't) box constructor 66.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to file creation unit 60 for assembly into a video file.

File creation unit 60 may correspond to a control unit including hardware, software, and/or firmware configured to perform the functions and procedures attributed thereto. The control unit may further perform the functions attributed to encapsulation unit 30 generally. For examples in which file creation unit 60 is embodied in software and/or firmware, encapsulation unit 30 may include a computer-readable medium comprising instructions for one or more processors associated with file creation unit 60 (as well as component assembly unit 62, component map box constructor 64, and component arrangement box constructor 66) and a processing unit to execute the instructions. Each of the sub-units of file creation unit 60 (component assembly unit 62, component map box constructor 64, and component arrangement box constructor 66, in this example) may be implemented as individual hardware units and/or software modules, and may be functionally integrated or further separated into additional sub-units.

File creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. File creation unit 60 may further include a non-transitory computer-readable medium storing instructions for any or all of component assembly unit 62, component map box constructor 64, and component arrangement box constructor 66, as well as a processor for executing the instructions.

In general, file creation unit 60 may create one or more video files including the received audio and video data. Component assembly unit 62 may produce a component of a content from the received encoded video and audio samples. The component may correspond to a number of segments, each of which may include one or more video fragments. Each of the segments may be independently retrievable by a client device, such as destination device 40. For example, file creation unit 60 may assign a unique URL or URN to a file including a segment. Component assembly unit 62 may generally ensure that encoded samples belonging to the same component are assembled with that component. Component assembly unit 62 may also assign unique component identifiers to each component of a content. File creation unit 60 may include data for more than one component in a file, and one component may span multiple files. File creation unit 60 may store data for a component as a track within a video file.

Component map box constructor 64 may produce a component map box for a multimedia content in accordance with the techniques of this disclosure. For example, the component map box may signal characteristics of the components of the content. These characteristics may include an average bitrate of the component, a maximum bitrate of the component, a resolution and frame rate of the component (assuming the component is a video component), dependencies to other components, or other characteristics. When dependencies are signaled, component map box constructor 64 may also specify a temporal layer difference between components having a dependent relationship. The component map box may also signal a set of potential multiplexing intervals or a range of multiplexing intervals available for the component. In some examples, file creation unit 60 may store the component map box in a file separate from all other files including coded samples for the content. In other examples, file creation unit 60 may include the component map box in a header of one of the video files.

By default, a component map box applies to an entire content. However, when a component map box applies only to a portion of the content, component map box constructor 64 may signal a temporal duration of the content to which the component map box applies. Component map box constructor 64 may then produce multiple component map boxes for the content in static mode or dynamic mode. In static mode, component map box constructor 64 groups all component map boxes together in an order corresponding to the temporal durations of the content to which the component map boxes correspond. In dynamic mode, component map box constructor 64 may place each component map box in a different location, e.g., different files.

The component map box may also signal whether a media fragment belongs to a new segment of a component. Because each segment of a component includes a component identifier, segments belonging to the same component can be identified, even when the segments are stored in separate files. The component map box may further signal timing information for the portions of a component within the files including encoded samples for the component. Accordingly, temporal splicing is naturally supported. For example, a client device, such as destination device 40, may determine that two distinct files include data for the same component, and a temporal ordering of the two files.

Component arrangement box constructor 66 may produce component arrangement boxes for each file produced by file creation unit 60. In general, component arrangement box constructor 66 may identify which components are included within the file, as well as a correspondence between component identifiers and track identifiers for the file. In this manner, the component arrangement box may provide a mapping between component identifiers for the content and track identifiers for the file. The track identifiers may correspond to a track of the file having encoded samples for the component specified in the mapping.

The component arrangement box may also indicate how fragments of each component are stored in a file. For example, component arrangement box constructor 66 may specify byte ranges for the fragments of a component in a file, byte offsets to a particular fragment, decoding time of a first sample in the media fragment, whether a random access point is present in the fragment, and if so, its decoding and presentation times and whether the random access point is an IDR or ODR picture.

After file creation unit 60 has produced a file, file output interface 84 may output the file. In some examples, file output interface 84 may store the file to a computer-readable storage medium, such as a hard disk. In some examples, file output interface 84 may send the file to another device configured to act as a server, e.g., an HTTP streaming server that implements HTTP 1.1, via output interface 32 (FIG. 1). In some examples, file output interface 84 may store the file to a local storage medium such that output interface 32 can provide the file to client devices, such as destination device 40, in response to, e.g., HTTP streaming requests.

Figure 3:
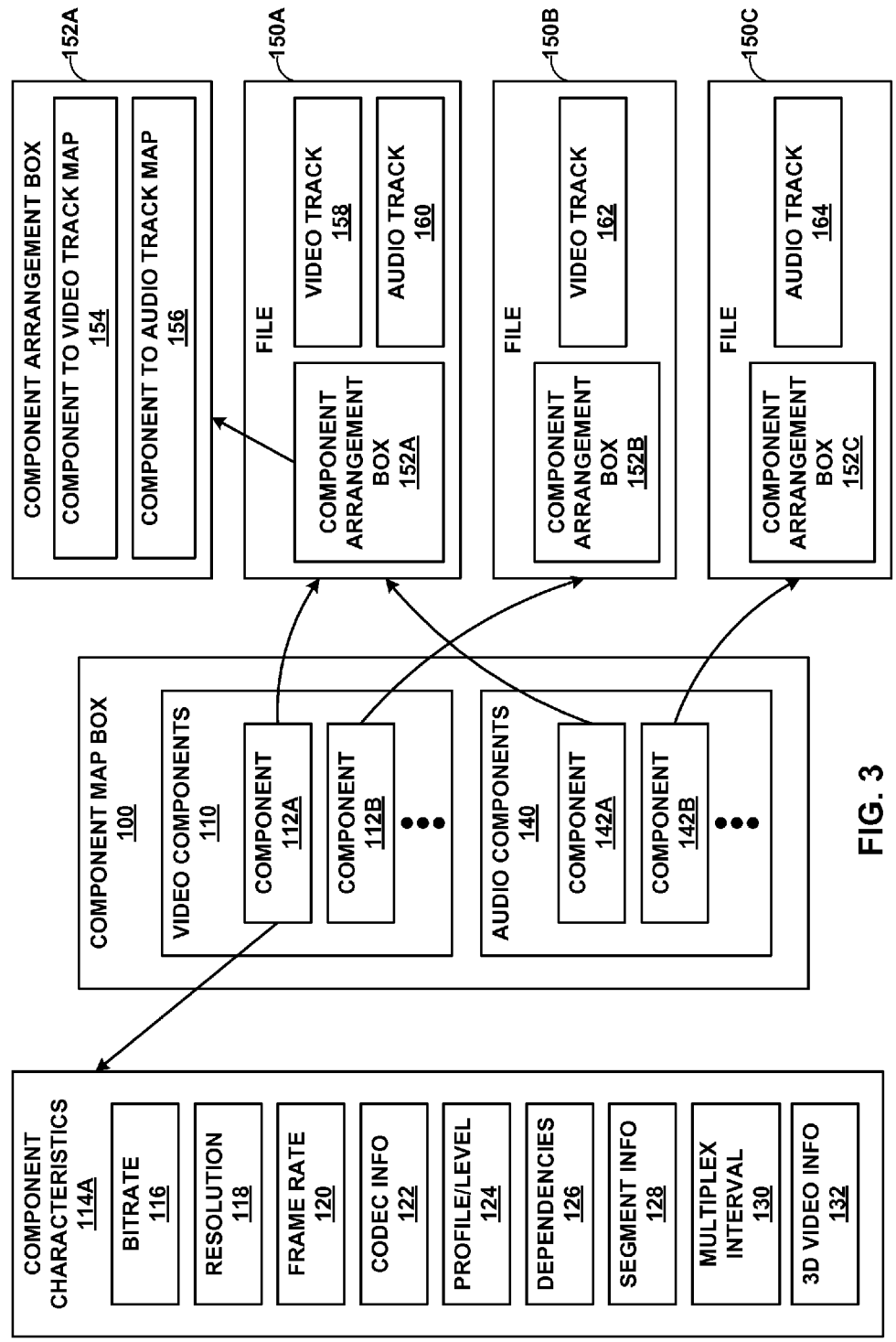
FIG. 3 is a conceptual diagram illustrating an example component map box and an example component arrangement box that may be used in the system of FIG. 1.

FIG. 3 is a conceptual diagram illustrating an example component map box 100 and component arrangement box 152A. In this example, component map box 100 includes video components 110 and audio components 140. It should be noted that component map box 110 itself includes signaled characteristics for video components 110 and audio components 140. As noted with respect to FIG. 2, component map box 100 and component arrangement boxes 152 may be generated by file creation unit 60, e.g., by component map box constructor 64 and component arrangement box constructor 66, respectively. In this manner, encapsulation unit 30 may signal characteristics of a multimedia content and files including data for the multimedia content. For example, video components 110 include signaled characteristics for components 112 and audio components 140 include signaled characteristics for components 142. As shown in this example, component 112A includes component characteristics 114A.

Component characteristics 114A, in this example, include bitrate information 116, resolution information 118, frame rate information 120, codec information 122, profile and level information 124, dependencies information 126, segment information 128, multiplexing interval information 130, and 3D video information 132.

Bitrate information 116 may include either or both of an average bitrate and a maximum bitrate for component 112A. Bitrate information 116 may also include flags indicating whether average and/or maximum bitrate information is signaled. For example, bitrate information 116 may include an average bitrate flag and a maximum bitrate flag, where the average bitrate flag indicates whether an average bitrate is signaled for component 112A and the maximum bitrate flag indicates whether a maximum bitrate is signaled for component 112A. Bitrate information 116 may also include an average bitrate value indicative of an average bitrate for component 112A. Likewise, bitrate information 116 may include a maximum bitrate value indicative of a maximum bitrate value over a certain period of time, e.g., over the interval of one second.

Resolution information 118 may describe the resolution of component 112A, e.g., in terms of pixel width and pixel height of a picture. In some cases, resolution information 118 may not be explicitly signaled for component 112A. For example, component characteristics 114A may include a default characteristics flag indicating whether a component having index i has the same characteristics of a component of the same content having index i-1. When the flag indicates that the characteristics are the same, the characteristics need not be signaled. The default characteristics may correspond to a subset of the available characteristics, such as, for example, resolution, frame rate, codec information, profile information, and level information, or other combinations of characteristics that can be signaled by a component map box, such as component map box 100. In some examples, individual flags are included for each potential component indicating whether the corresponding characteristic for the component is the same as a previous component.

Frame rate information 120 may be designated as a default characteristic as described above, in some examples. Alternatively, frame rate information 120 may specify a frame rate for component 112A. The frame rate may be specified in frames per 256 seconds of the video component. Codec information 122 may also be designated as a default characteristic, as described above. Alternatively, codec information 122 may specify an encoder used to encode component 112A. Similarly, profile and level information 124 may be designated as default characteristics or explicitly specified, e.g., as profile indicator (profile_idc) and level indicator (level_idc) values.

Dependencies information 126 may indicate whether component 112A is dependent on other ones of components 110. If so, dependency information 126 may include information indicating a temporal identifier for component 112A and a difference between the temporal identifier for component 112A and the temporal identifier for the component on which component 112A depends.

Segment information 128 describes segments of component 112A. The segments may be stored in files, such as files 150. In the example of FIG. 3, data for segments of component 112A may be stored in file 150A, specifically in video track 158, as discussed in greater detail below. In some cases, segments for component 112A may be stored in multiple files. Each segment may correspond to one or more fragments. For each fragment, segment information 128 may signal whether the fragment includes a random access point, a type for the random access point (e.g., IDR or ODR), whether the fragment corresponds to a new file (e.g., new segment), a byte offset to the start of the fragment, timing information for the first sample of the fragment (e.g., decoding and/or display time), a byte offset to a next fragment, a byte offset to the random access point, if present, and a number of samples for which to skip decoding when beginning a stream at an ODR RAP.

Multiplexing interval information 130 may specify a set or a range of multiplexing intervals for component 112A. 3D video information 132 may be included when component 112A is to be used to produce a three-dimensional effect, e.g., by displaying two or more slightly different views of a scene simultaneously or nearly simultaneously. 3D video information 132 may include a number of views to be displayed, identifiers for components corresponding to the views, a starting time of the starting time of a 3D representation for a particular basic video component, a temporal duration of the 3D representation, target resolutions (e.g., target width and target height of the 3D representation when ultimately displayed), positioning information (e.g., horizontal offset and vertical offset in a display window), a window layer that indicates the layer of the decoded video component for presentation, and a transparent factor. In general, a lower window layer value may indicate that the associated video component is to be rendered earlier and may be covered by a video component with a higher layer value. The transparency level information may be combined with the window level information. When the component is combined with another component having a lower window layer value, each pixel in the other component may be weighted with a value of [transparent level]/255, and the collocated pixel in the current component may be weighted with a value of (255−[transparent level])/255.

FIG. 3 illustrates a correspondence between components 112, 142 and various files 150 including data for components 112, 142. In this example, file 150A includes encoded samples for video component 112A in the form of video track 158 and encoded samples for audio component 142A in the form of audio track 160. File 150A also includes component arrangement box 152A. As further illustrated in this example, component arrangement box 152A includes component to video track map 154 and component to audio track map 156. Component to video track map 154 indicates that the component identifier for component 112A is mapped to video track 158 of file 150A. Similarly, component to audio track map 156 indicates that the component identifier for component 142A is mapped to audio track 160 of file 150A.

In this example, component 112B corresponds to video track 162 of file 150B and component 142B corresponds to audio track 164 of file 150C. Accordingly, component arrangement box 152B may include a mapping between component 112B and video track 162, while component arrangement box 152C may include a mapping between component 142B and audio track 164. In this manner, a client device may retrieve component map box 100 and component arrangement boxes 152 to determine which components to request, and how to access encoded data for the components from files 150.

The pseudocode below is one example implementation of a data structure for a component map box.

```
aligned(8) class ComponentMapBox extends FullBox
('cmmp', version, 0) {
    unsigned int(32) box_length;
    unsigned int(64) content_ID;
    unsigned int(32) timescale;
    unsigned int(8) video_component_count;
    unsigned int(8) audio_component_count;
    unsigned int(8) other_component_count;
    bit (1) first_cmmp_flag; //default 1
    bit (1) more_cmmp_flag; //defualt 0
    bit (2) cmmp_byte_range_idc;
    bit (1) multi_video_present_flag;
    bit (2) multiplex_interval_idc;
    bit (1) duration_signalled_flag;
    bit (1) dynamic_component_map_mode_flag;
    bit (7) reserved_bit;
    if (duration_signalled_flag) {
        unsigned int (64) starting_time;
        unsigned int (64) duration;
    }
    for (i=1; i<=video_component_count; i++) {
        unsigned int(8) component_ID;
        bit (1) average_bitrate_flag;
        bit (1) maximum_bitrate_flag;
        bit (1) default_characteristics_flag;
        bit (2) resolution_idc;
        bit (2) frame_rate_idc;
        bit (2) codec_info_idc;
        bit (2) profile_level_idc;
        bit (1) dependency_flag;
        bit (1) 3DVideo_flag;
        bit (2) reserved_flag;
        //bitrate
        if (average_bitrate_flag)
            unsigned int (32) avgbitrate;
        if (maximum_bitrate_flage)
            unsigned int (32) maxbitrate;
        // resolution
        if (!default_characteristics_flag) {
            if (resolution_idc == 1) {
                unsigned int (16) width;
                unsigned int (16) height;
            }
            else if (resolution_idc == 2 )
                unsigned int (8) same_cha_component_id;
            // when resolution_idc equal to 0, the
            resolution is not specified, when the
            // value equal to 3, it has the same
            resolution as the component with an
            // index of i-1.
            // frame rate
            if (frame_rate_idc ==1)
                unsigned int (32) frame_rate;
            else if ( frame_rate_idc == 2 )
                usngined int (8) same_cha_component_id;
            // when frame_rate_idc equal to 0, the frame
            rate is not specified, when the
            // value is equal to 3, it has the same frame
            rate as the component with an
            // index of i-1.
            if (codec_info_idc == 1)
                string [32] compressorname;
            else if ( codec_info_idc == 2)
                unsingedn int (8) same_cha_component_id;
            //profile_level
            if (profile_level_idc == 1)
                profile_level;
            else if ( profile_level_idc == 2)
                unsigned int (8) same_cha_component_id ;
        }
```

-continued

```
        if (dependency_flag) {
            unsigned int (8) dependent_comp_count;
            bit (1)        temporal_scalability;
            unsigned int (3) temporal_id;
            bit (4)        reserved;
            for ( j=1; j<= dependent_comp_count ; j++) {
                unsigned int (6) dependent_comp_id;
                if (temporal_scalability)
                    unsigned int (2) delta_temporal_id;
            }
        }
        if (3DV_flag) {
            unsigned int (8) number_target_views;
        }
        // segments
        if (cmmp_byte_range_idc > 0) {
            unsigned int (16) entry_count_byte_range;
            for(j=1; i <=entry_count; j++) {
                int (2)            contains_RAP;
                int (1)            RAP_type;
                bit (1)            new_file_start_flag;
                int (4)            reserved;
                unsigned int(32)   reference_offset;
                unsigned int(32)   reference delta time;
                if (cmmp_byt_rage_idc>0)
                    unsigned int (32)   next_fragment_offset;
                if ( contain_RAP > 1 ) {
                    unsigned int(32)   RAP_delta_time;
                    unsigned int(32)   delta_offset;
                }
                if ( contain_RAP > 0 && RAP_type !=0) {
                    unsigned int(32)   delta_DT_PT;
                    unsigned int(8)    number_skip_samples;
                }
            }
        }
        if (multiplex_interval_idc == 1) {
            unsigned int (8) entry_count;
            for (j=1; j<=entry_count;j++)
                unsigned int (32) multiplex_time_interval;
        }
        else if (multiplex_interval_idc == 2) {
            unsigned int (32) min_muliplex_time_interval;
            unsigned int (32) max_muliplex_time_interval;
        }
    }
    if ( multi_video_present flag ) {
        unsigned int (8) multi_video_group_count;
        for (i=1; i<= multi_video_group_count ; i++) {
            unsigned int (8) basic_video_component_id;
            unsigned int (8) extra_video_component_count;
            int (64) media_time;
            int (64) duration;
            for (j=1; j<= extra_video_component_count ; j++)
                unsigned int (8) component_id;
            for (j=0; j<= extra_video_component_count ; j++) {
                unsigned int (16) target_width;
                unsigned int (16) target_height;
                unsigned int (16) horizontal_offset;
                unsigned int (16) vertical_offset;
                unsigned int (4) window_layer;
                unsigned int (8) transparent_level;
            }
        }
    }
    for (i=1; i<= audio_component_count; i++) {
        unsigned int(8) component_ID;
        bit (1) average_bitrate_flag;
        bit (1) maximum_bitrate_flag;
        bit (2) codec_info_idc;
        bit (2) profile_leve_idc;
        ...
        // similar to the syntax table for video components
    }
}
```

The semantics of the pseudocode elements in this example are as follows. It should be understood that, in other examples, other variable names and semantics may be assigned to elements of a component map box. In this example, box_length indicates the length of the component map box in units of bytes. Content_ID specifies a unique identifier of the content a streaming server provides.

Timescale is an integer that specifies the time-scale for an entire service. This is the number of time units that pass in one second. For example, a time coordinate system that measures time in sixtieths of a second has a time scale of 60.

Video_component_count specifies the number of alternative video components the service corresponding to the component map box could provide. Any two video components defined in this box can be switched to one another. If there are video presentations that consist of multiple representations, such a presentation may contain one component belonging to the alternative video component group.

Audio_component_count specifies the number of alternative audio components the service corresponding to the component map box could provide. Any two audio components defined in this box can be switched to one another. Other_component_count specifies the number of other components of the service corresponding to the component map box.

First_cmmp_flag indicates whether this component map box is the first box of the same type for the associated service. More_cmmp_flag indicates whether this component map box is the last box of the same type for the associated service.

Cmmp_byte_range_idc having a value equal to 0 indicates that the byte range and timing information is not signaled in the component map box. Cmmp_byte_range_idc having a value greater than 0 indicates that the byte range and timing information is signaled in the component map box. Cmmp_byte_range_idc having a value equal to 1 indicates that only the starting byte offset of a segment of a component is signaled. Cmmp_byte_range_idc having a value equal to 2 indicates that both the starting byte offset and the ending byte offset of a segment of a component is signaled.

Temporal_scalability indicates whether the current component is dependent on the following signaled content components, at least one of which has a lower temporal_id. Temporal_id indicates the temporal identifier of the current component. The temporal_id value may be ignored if the temporal_scalability value is equal to 0. Delta_temporal_id indicates the difference of the highest temporal identifier value of all of the samples of the current component and the highest temporal identifier value of the dependent component.

Multi_video_present_flag having a value equal to 1 indicates there are video presentations rendered from more than one decoded video component. For example, in the case of picture-in-picture, multi_video_present_flag may have a value equal to 0, which may indicate that no video presentation is rendered by more than one decoded video component.

Multiplex_interval_idc having a value equal to 0 indicates the multiplexing interval is not signaled. Multiplex_interval_idc having a value equal to 1 indicates that a list of multiplexing intervals is signaled. Multiplex_interval_idc having a value equal to 2 indicates that a range of multiplexing intervals is signaled.

Duration_signalled_flag indicates whether the duration of the service to which the component map box corresponds is signaled or not. If the duration is not signaled (e.g., when duration_signalled_flag has a value equal to 0), the current component map box is assumed to apply to the whole service.

Dynamic_component_map_mode_flag indicates whether the dynamic mode is supported for the current component map box. Dynamic_component_map_mode_flag having a value equal to 1 indicates static mode and the next component map box of the same service, if it exists, follows the current component map box in the same file immediately. Dynamic_component_map_mode_flag having a value equal to 0 indicates dynamic mode and thus the next component map box of the same service will be transmitted to client later by different means. For example, the next component map box may be included in a movie box of a following file.

Starting_time indicates the starting time of the service to which the current component map box applies. Duration indicates the duration of the content for which the current component map box applies.

Component_ID is a unique identifier of a component. Average_bitrate_flag indicates whether the average bit rate is signaled for the associated component. Maximum_bitrate_flag indicates whether the maximum bit rate is signaled for the associated component. Bitrate value 116 of FIG. 3 may correspond to either or both of average_bitrate_flag and maximum_bitrate_flag in the pseudocode. Default_characteristics_flag indicates whether the current component with an index of i has the same values as the component with an index of i−1 for the following characteristics: resolution, frame rate, codec information, profile and level.

Resolution_idc/frame_rate_idc/codec_info_idc/profile_level_idc values being set to 0 indicates the resolution, frame rate, codec information, profile, and/or level (respectively) of the associated video component is not signaled. Resolution_idc may correspond to resolution value 118 of FIG. 3. Frame_rate_idc may correspond to frame rate value 120 of FIG. 3. Codec_info_idc may correspond to codec info value 122 of FIG. 3. Profie_level_idc may correspond to profile/level value 124 of FIG. 3. These values being set to 1 indicates that the resolution, frame rate, codec information, profile, or level (respectively) of the associated video component is the same as the video component with a index of i−1. Any of these values being set to 2 indicates that the respective value is equal to one specific video component, signaled using the value "same_cha_component_id."

Dependency_flag indicates whether the dependency of the current video component is signaled. When dependency_flag indicates that the component is dependent on other video components, the components on which the current component depends may also signaled. That is, if the dependency is signaled, the corresponding video component is dependent on the signaled video components. The dependency_flag value, along with the signaled video components on which the current component is dependent, may correspond to dependencies value 126 of FIG. 3.

3DVideo_flag indicates whether the current video component is related to MVC or other video content providing a 3D representation. Number_target_views specifies the number of views target for out when decoding a 3D video component, e.g., coded with MVC (multiview video coding). Entry_count_byte_range specifies the number of fragments signaled for the associated component. 3DVideo_flag, number_target_views, and entry_count_byte_range may generally correspond to 3D video information value 132 of FIG. 3.

Avgbitrate indicates the average bitrate of the associated component. Maxbitrate indicates the maximum bitrate of the associated component calculated in any interval of a second. Width and height indicate the resolution, in units of luma pixels, of the decoded video component.

Same_resl_component_id indicates the component identifier of the video component having the same specific characteristics (resolution or frame rate or codec information, or profile and level) of the associated video component.

Frame_rate indicates the frame rate, in frames per 256 seconds, of the video component. Compressorname is a 4 byte value indicating the brand of the codec, for example, "avc1." It has the same semantics as the major_brand of the file type box. Profile_level indicates the profile and level required to decode the current video component. Dependent_comp_count indicates the number of dependent video component for the associated video components.

Dependent_comp_id specifies the component identifier of one of the video components that the associated video component depends on. In the same time instance, samples in different content components may be ordered in an ascending order of the index of the content components. That is, the sample with an index of j may be placed earlier than a sample with an index of j+1, and the sample of the current content component may be the last sample in the time instance.

Contains_RAP indicates whether fragments of the component contain a random access point. Contains_RAP is set to 0 if the fragment does not contain any random access point. Contains_RAP is set to 1 if the fragment contains a random access point as the first sample in the fragment. Contains_RAP is set to 2 if the random access point is not the first sample of the fragment. RAP_type specifies the type of random access points (RAPS) contained in the referenced track of the movie fragment. RAP_type is set to 0 if the random access point is an instantaneous decoder refresh (IDR) picture. RAP_Type is set to 1 if the random access point is an open GOP random access point, e.g., an open decoder refresh (ODR) picture.

New_file_start_flag flag indicates whether a fragment is the first fragment of a corresponding component in a file. This implies that the current indicated fragment is in a new file. This signaling may be beneficial when relatively small size files are used in the server or temporal splicing is used.

Reference_offset indicates the offset to the starting byte of a fragment in the file containing the fragment. Reference_delta_time indicates the decoding time of the associated fragment. Next_fragment_offset indicates the starting byte offset of the next fragment of the associated video component in the file containing the fragment. RAP_delta_time indicates the decoding time difference between the first IDR random access point and the first sample of the fragment. Delta_offset indicates the byte offset difference between the byte offset of the first sample of the fragment and the byte offset of the random access point.

Delta_DT_PT indicates the difference of the decoding time and presentation time for the RAP which is an ODR (open GOP random access point). Number_skip_samples indicates the number of samples having a presentation time prior to and a decomposition time after an ODR, which may be the first RAP of a referenced track of a movie fragment. Note that a decoder may skip the decoding of these samples if the decoder receives a stream starting with the ODR. Contains_RAP, RAP_type, new_file_start_flag, reference_offset, refrence_delta_time, next_fragment_offset, RAP_delta_time, delta_offset, delta_DT_PT, and number_skip_samples may generally correspond to segment information 128.

Multiplex_time_interval indicates the multiplexing interval in unit of timescale for the associated video component. Video components are generally associated with multiplexing interval information, although multiplexing interval information can also be signaled for audio components. Multiplex_time_interval may correspond to multiplex interval value 130 of FIG. 3. Min_muliplex_time_interval and max_muliplex_time_interval indicate the range of multiplexing interval in unit of timescale for the associated video component. Multi_video_group_count specifies the number of video presentations which are to be displayed as a combination of multiple decoded video components.

Basic_video_component_id specifies the component identifier of the basic video component. Other extra video components signaled are considered together with the basic video component as one alterative video presentation. For example, suppose the previous loop of "for video_component_count of video components" includes seven video components, having CIDs 0, 1, 2, 3, 4, 5, 6. Suppose further that there is a basic_video_component_id with a number of 3 and two extra video components, 5 and 6. Then only the following group of presentations are alternative to each other {0}, {1}, {2}, {3, 5, 6} and {4}.

Media_time indicates the starting time of the multi-video representation with a basic video component that has an identifier of basic_video_component_id. Duration specifies the duration of the multi-video presentation with a basic video component that has an identifier of basic_video_component_id. Target_width and target_height specify the target resolution of the a video component in this multi-video presentation. Note that if this not the same as the original resolution of the video, the destination device may perform scaling.

Horizontal_offset and vertical_offset specify the offset in horizontal and vertical offsets in the display window. Window_layer indicates the layer of the decoded video component for presentation. A lower layer value may indicate the associated video component is rendered earlier and may be covered by a video component with a higher layer value. Decoded video components may be rendered in ascending order of window_layer values.

Transparent_level indicates the transparent factor used when this decoded video is combined with a window_layer that is lower than the current video component. For each pixel, the existing pixel may be weighted with a value of transparent_level/255, and the co-located pixel in the current decoded video component may be weighted with a value of (255−transparent_level)/255.

The pseudocode below is one example implementation of a data structure for a component arrangement box.

```
aligned(8) class ComponentArrangeBox extends
FullBox('cmar', version, 0) {
    unsigned int(64) content_ID;
    unsigned int(8) component_count;
    bit (1) track_map_flag;
    bit (1) sub_fragment_flag;
    bit (1) agg_fragment_flag;
    for (i=1; i<= component_count; i++) {
        unsigned int(8) component_ID;
        if (track_map_flag)
            unsigned int(32) track_id;
    }
    if (sub_fragment_flag) {
        unsigned int (8) major_component_count;
        for (i=1; i<= major_component_count; i++) {
            unsigned int(8) full_component_ID;
            unsigned int(8) sub_set_component_count;
            for (j=1; j< sub_set_component_count; j++)
                unsigned int(8) sub_set_component_ID;
        }
    }
    if (agg_fragment_flag) {
        unsigned int (8) aggregated_component_count;
        for (i=1; i<= aggregated_component_count; i++) {
            unsigned int (8) aggr_component_id;
            for (j=1; j<= dependent_component_count; j++)
                unsigned int (8) depenedent_component_ID;
        }
    }
}
```

The semantics of the pseudocode elements in this example are as follows. It should be understood that in other examples, other variable names and semantics may be assigned to elements of a component arrangement box.

Component_count specifies the number of components in the current file. Track_map_flag indicates whether the mapping of tracks in this file to components of the service with a service identifier of content_ID is signaled.

Sub_fragment_flag indicates whether the mapping of sub tracks in this file to components is signaled. Agg_fragment_flag indicates whether the mapping of track aggregations in this file to components is signaled. Major_component_count indicates the number of major components, which contain all the samples in the file.

Component_ID values indicate identifiers of the major components stored in the file, in the order of the first sample of each component in each movie fragment. Track_id indicates the identifier of the track which corresponds to a component with a component identifier of component_ID.

Sub_set_component_count indicates a number of sub components which form a full set of component with a component_id of full_component_ID. Sub_set_component_ID specifies the component_id values of the sub components which form a full set of a component with a component_id of full_component_ID. Any two sub components of a same component do not have overlapped samples.

In some examples, aggregated_component_count indicates the number of content components which are aggregated from other components in the file. In some examples, aggregated_component_count indicates the number of dependent components needed to aggregating the aggregated content component with a component identifier of aggr_component_id. Aggr_component_id specifies the component identifier of the component that is aggregated. Depenedent_component_ID specifies the component id of the components used to aggregate the component with an id of aggr_component_id.

Table 1 below illustrates another example set of syntax objects consistent with the techniques of this disclosure. The "Element or Attribute Name" column describes the name of the syntax object. The "Type" column describes whether the syntax object is an element or an attribute. The "Cardinality" column describes the cardinality of the syntax object, that is, the number of instances of the syntax object in an instance of a a data structure corresponding to Table 1. The "Optionality" column describes whether the syntax object is optional, in this example, where "M" indicates mandatory, "O" indicates optional, "OD" indicates optional with a default value, and "CM" indicates conditionally mandatory. The "description" column describes the semantics of the corresponding syntax object.

TABLE 1

| Element or Attribute Name | Type | Cardinality | Optionality | Description |
| --- | --- | --- | --- | --- |
| MPD | E | 1 | M | The root element that carries the Media Presentation Description for a Media Presentation. |
| type | A | | OD default: OnDemand | "OnDemand" or "Live". Indicates the type of the Media Presentation. Currently, on-demand and live types are defined. If not present, the type of the presentation shall be inferred as OnDemand. |
| availabilityStartTime | A | | CM Must be present for type = "Live" | Gives the availability time (in UTC format) of the start of the first Period of the Media Presentation. |
| availabilityEndTime | A | | O | Gives the availability end time (in UTC format). After this time, the Media Presentation described in this MPD is no longer accessible. When not present, the value is unknown. |
| mediaPresentationDuration | A | | O | Specifies the duration of the entire Media Presentation. If the attribute is not present, the duration of the Media Presentation is unknown. |
| minimumUpdatePeriodMPD | A | | O | Provides the minimum period the MPD is updated on the server. If not present the minimum update period is unknown. |
| minBufferTime | A | | M | Provides the minimum amount of initially buffered media that is needed to ensure smooth playout provided that each Representation is delivered at or above the value of its bandwidth attribute. |
| minBufferSwitching | A | | M | Provides the minimum amount of initially buffered media that is needed to ensure seamless switching |

TABLE 1-continued

| Element or Attribute Name | Type | Cardinality | Optionality | Description |
|---|---|---|---|---|
| | | | | between Representations provided that each Representation is delivered at or above the value of its bandwidth attribute. |
| timeShiftBufferDepth | A | | O | Indicates the duration of the time shifting buffer that is available for a live presentation. When not present, the value is unknown. If present for on-demand services, this attribute shall be ignored by the client. |
| baseURL | A | | O | Base URL on MPD level |
| ProgramInformation | E | 0, 1 | O | Provides descriptive information about the program |
| moreInformationURL | A | | O | This attribute contains an absolute URL which provides more information about the Media Presentation |
| Title | E | 0, 1 | O | May be used to provide a title for the Media Presentation |
| Source | E | 0, 1 | O | May be used to provide information about the original source (for example content provider) of the Media Presentation. |
| Copyright | E | 0, 1 | O | May be used to provide a copyright statement for the Media Presentation. |
| Period | E | 1 ... N | M | Provides the information of a Period |
| Start | A | | M | Provides the accurate start time of the Period relative to the value of the attribute availabilityStart time of the Media Presentation. |
| segmentAlignmentFlag | A | | O Default: false | When True, indicates that all start and end times of media components of any particular media type are temporally aligned in all Segments across all Representations in this Period. |
| bitstreamSwitchingFlag | A | | O Default: false | When True, indicates that the result of the splicing on a bitstream level of any two time-sequential Media Segments within a Period from any two different Representations containing the same media types complies to the Media Segment format. |
| SegmentInfoDefault | E | 0, 1 | O | Provides default Segment information about Segment durations and, optionally, URL construction. |
| duration | A | | O | Default duration of Media Segments |
| baseURL | A | | O | Base URL on Period level |
| sourceUrlTemplatePeriod | A | | O | The source string providing the URL template on period level. |
| Representation | E | 1 ... N | M | This element contains a description of a Representation. |
| repID | A | | M | The unique ID of the associated Representation within this presentation. |
| defaultAttrRepID | A | | O | The ID of the representation, the attributes of which will be used as default attributes of the associated representation. The |

TABLE 1-continued

| Element or Attribute Name | Type | Cardinality | Optionality | Description |
|---|---|---|---|---|
| | | | | applicable attributes include the following ones from profileLevel through those in the 3D video element. |
| profileLevel | A | | O | The profile_idc and level_idc for the Representation. |
| bandwidth | A | | M | The minimum bandwidth of a hypothetical constant bitrate channel in bits per second (bps) over which the representation can be delivered such that a client, after buffering for exactly minBufferTime can be assured of having enough data for continuous playout. |
| width | A | | O | Specifies the horizontal resolution of the video media type in an alternative Representation, counted in pixels. |
| height | A | | O | Specifies the vertical resolution of the video media type in an alternative Representation, counted in pixels. |
| frameRate | A | | O | Specifies the frame rate of the video media type in the Representation. |
| dependencyGroupId | A | | O | Specifies the dependency group to which this Representation is assigned. Representation in a dependency group with a temporal_id value TID depends on the Representations in the same dependency group with lower temporal_id values. |
| temporalId | A | | O | Specifies the temporal_id of the video media type in the Representation |
| 3D video | E | 0, 1 | O | Provides the information for 3D video in the representation |
| MVC | E | 0, 1 | O | When present, provides the information of the MVC representation. |
| numTOV | A | 1 | O Default: 1 | Number of target output views for the representation. 1 for free-viewpoint video |
| ViewID | E | 1 ... numTOV | | View identifier of a target output view |
| videoPlusDepth | A | 0, 1 | O Default: False | When True, indicates the representation is contains a single-video plus depth map. |
| MVD | E | 0, 1 | O Default: False | When present, indicate the representation is a mulitiview video plus depth representation. |
| numViews | A | 0, 1 | O Default: 2 | Indicates the number of views contained in the MVD representation. |
| dependableOnly RepFlag | A | 0, 1 | O default: false. | When true, specifies the Representation is a dependent only representation, thus, cannot be required separately as a legal Representation for the belonging media type. |
| Dependency | E | 0 ... N | O | This element contains a description of one direct dependent representation. The dependent representations must be contained in the MPD in an order such that the corresponding NAL units in |

TABLE 1-continued

| Element or Attribute Name | Type | Cardinality | Optionality | Description |
|---|---|---|---|---|
| | | | | the access units of the re-assembled representation are in a decoding order. |
| dependent_representationID | A | | O | Specifies the identifier of a direct dependent Representation. |
| PIP | E | 0, 1 | O | This element contains a description of PictureInPicture. |
| PiPSuppleRepID | A | 1 | CM | Specifies the identifier of a Representation, together with which the current representation needs to be rendered together. The Representation signaled here is complementary and thus must have the dependableOnlyRepFlag equal to True. |
| lang | A | | O | Declares the language code(s) for this Representation according to RFC 5646 [106]. Note, multiple language codes may be declared when e.g. the audio and the subtitle are of different languages. |
| mimeType | A | | M | Gives the MIME type of the Initialisation Segment, if present; if the Initialisation Segment is not present it provides the MIME type of the first Media Segment. Where applicable, this MIME type includes the codec parameters for all media types. The codec parameters also include the profile and level information where applicable. For 3GP files, the MIME type is provided according to RFC 4281 [107]. |
| groupType | A | | OD Default: 0 | Specifies the group type to which this Representation is assigned. |

With respect to the example of FIG. 3, a client device may request component map box 100, which includes information for characteristics of video components 110 and audio components 140. For example, component 112A is described by component characteristics 114A. Likewise, each of the other components may be described by component characteristics information similar to component characteristics 114A. The client device may also retrieve component arrangement boxes 152, which describe mappings between component identifiers and tracks of audio and video data, such as video tracks 158, 162 and audio tracks 160, 164. In this manner, component map box 100 is stored separately from files 150, which include coded samples of audio and video data. The client device may use the data of component map box 100 and component arrangement boxes 152 to select a representation of content and to request segments of selected components, e.g., in accordance with a network streaming protocol such as HTTP streaming.

Figure 4:
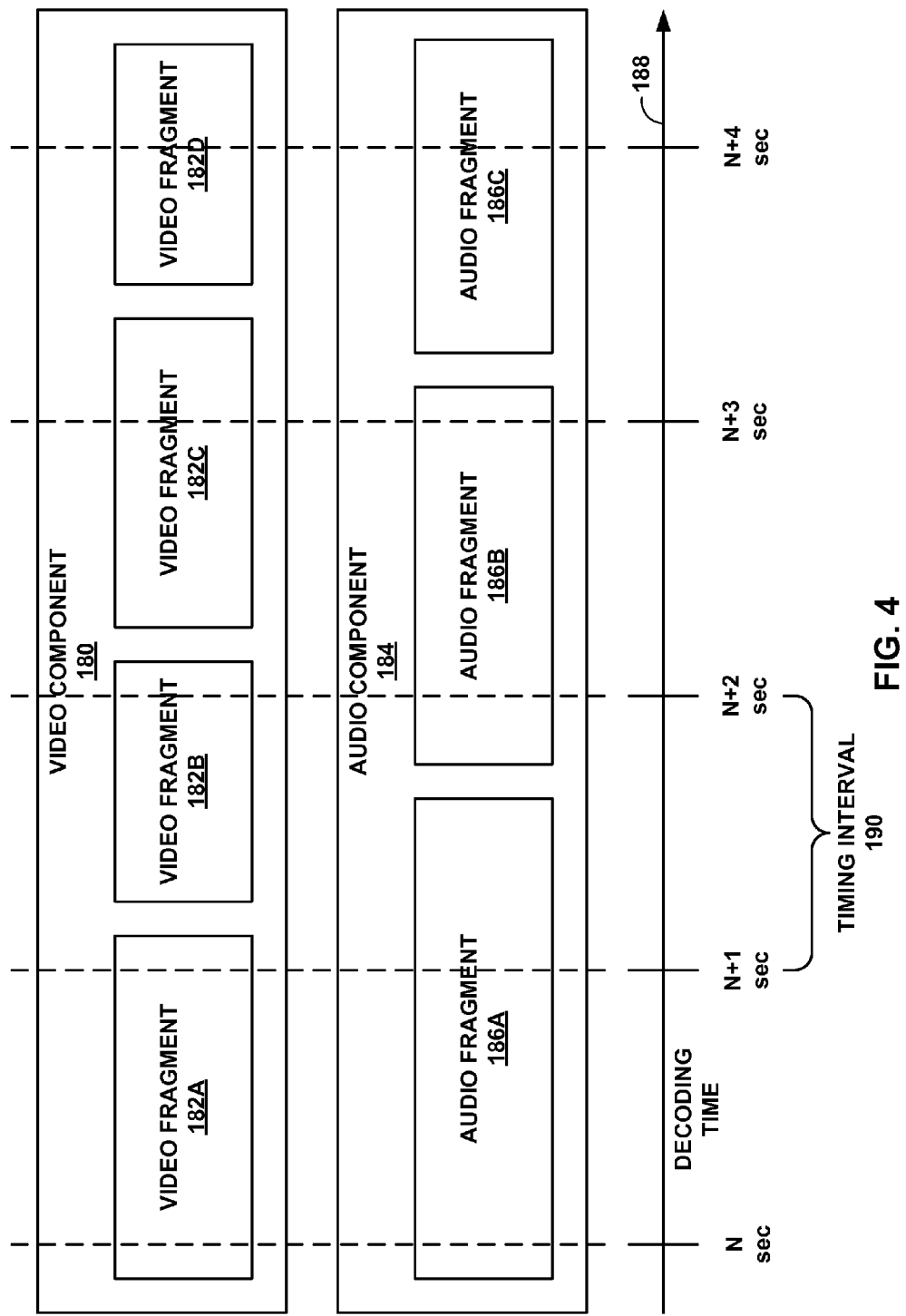
FIG. 4 is a conceptual diagram illustrating an example timing interval for multiplexing an example video component and an example audio component in the system of FIG. 1.

FIG. 4 is a conceptual diagram illustrating an example timing interval 190 for multiplexing video component 180 and audio component 184. In this example, a representation includes video component 180 and audio component 184. Video component 180 includes video fragments 182A-182D (video fragments 182), while audio component 184 includes audio fragments 186A-186C (audio fragments 186). Video fragments 182 may include encoded video samples, while audio fragments 186 may include encoded audio samples.

Video fragments 182 and audio fragments 186 may be arranged in decoding time order within video component 180 and audio component 184, respectively. Axis 188 of FIG. 4 indicates decoding time information for video component 180 and audio component 184. In this example, decoding time increases from left to right, as shown by axis 188. Thus, a client device may decode video fragment 182A before video fragment 182B, for example.

FIG. 4 also illustrates an example timing interval 190 of one second. In accordance with the techniques of this disclosure, a component map box for video component 180 and audio component 184 may indicate that timing interval 190 is one of a potential set of timing intervals or may indicate a range of timing intervals including timing interval 190. A client device may use this information to request fragments from video component 180 and audio component 184 in a manner to avoid buffer overflow but also to ensure that a sufficient amount of data is buffered that can be decoded before a next set of information can be streamed over a network.

As noted above, this disclosure relates to network streaming situations, where a client continuously requests data from a server and decodes and renders the data as the data is being retrieved. For example, while decoding and rendering data of video fragment 182A and audio fragment 186A, a client device may request video fragment 182B and audio fragment 186B. As shown in the example of FIG. 4, video fragments 182 and audio fragments 186 are not necessarily temporally aligned. Accordingly, a client device may use the timing interval information to determine when to request data of subsequent fragments of video component 180 and audio component 184.

In general, a client device may be configured to retrieve fragments having a starting decoding time within a next timing interval. If a component includes a fragment having a starting decoding time within the next timing interval, the client may request that fragment. Otherwise, the client may skip requests for data from the component until a subsequent timing interval.

In the example of FIG. 4, timing interval 190 is equal to 1 second. The decoding time values of video fragments 182 of video component 180 may be, in this example, N−1 seconds for video fragment 182A, N+1.2 seconds for video fragment 182B, N+2.1 seconds for video fragment 182C, and N+3.3 for video fragment 182D. The decoding time values of audio fragments 186 of audio component 184 may be, in this example, N−0.2 seconds for audio fragment 186A, N+1.3 seconds for audio fragment 186B, and N+3.2 seconds for audio fragment 186C.

As an example, assume that the next upcoming local decoding time at destination device 40 is N+2 seconds. Accordingly, destination device 40 may determine which component fragments have a decoding time between N+2 and N+3 seconds, that is, the local decoding time plus timing interval 190. Fragments of components having starting decoding times between N+2 and N+3 seconds may correspond to the next fragments to be requested. In this example, video fragment 182C has a decoding time between N+2 and N+3 seconds. Thus, destination device 40 may submit a request to retrieve video fragment 182C, e.g., an HTTP partial Get request specifying the byte range of video fragment 182C. As none of audio fragments 186 have a decoding time between N+2 and N+3, destination device 40 would not yet submit a request for any of audio fragments 186.

As another example, when the upcoming local decoding time is N+3 seconds, destination device 40 may submit requests for video fragment 182D and audio fragment 186C. That is, video fragment 182D and audio fragment 186C have decoding times between N+3 seconds and N+4 seconds. Therefore, destination device 40 may submit requests for video fragment 182D and audio fragment 186C.

As still another example, suppose instead that timing interval 190 were 2 seconds. If the local decoding time were N+1 seconds, then destination device 40 may first determine that video fragments 182B and 182C and audio fragment 186B have decoding times between N+1 seconds and N+3 seconds. Accordingly, destination device 40 may submit requests for video fragments 182B and 182C and audio fragment 186B.

Figure 5:
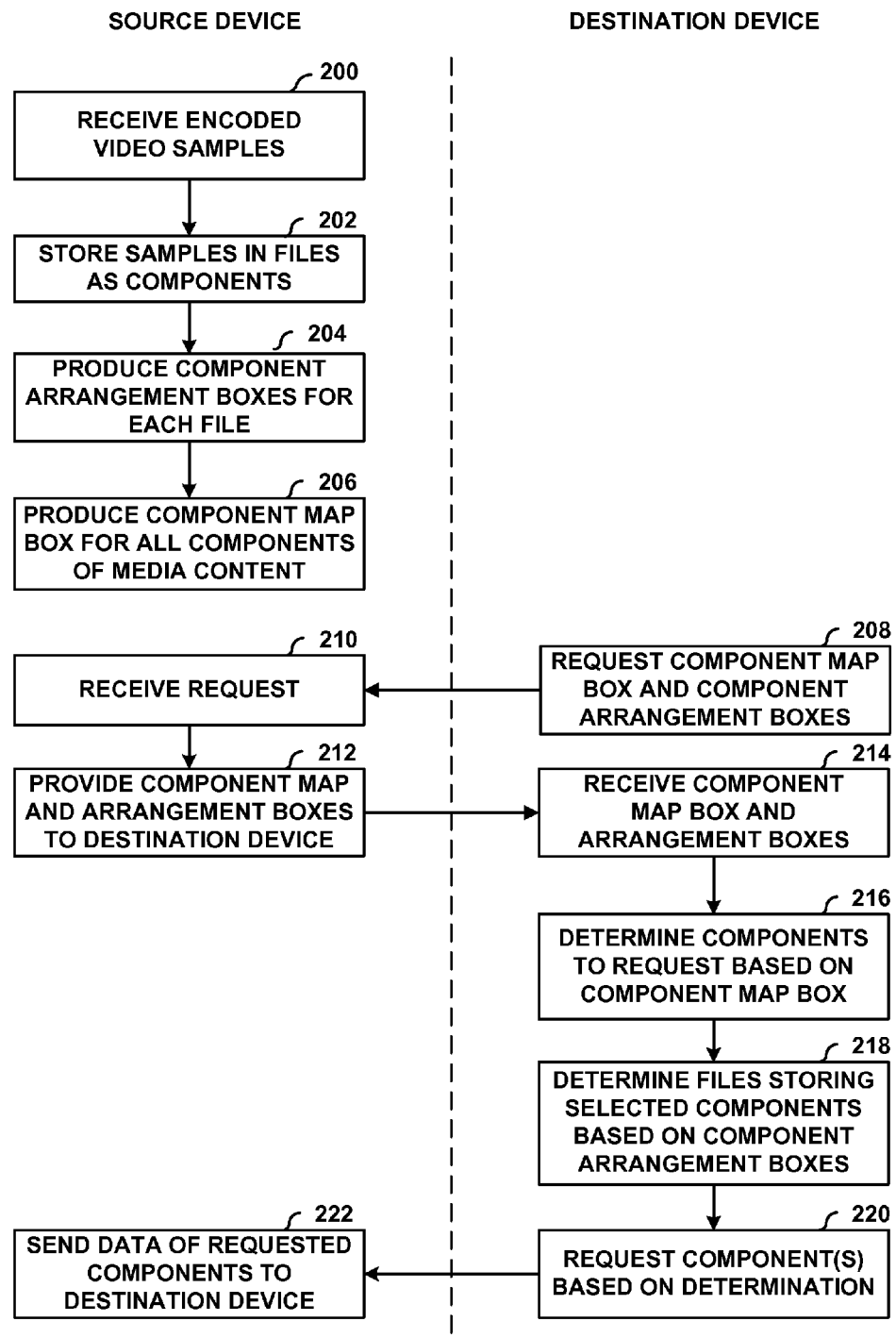
FIG. 5 is a flowchart illustrating an example method for providing a component map box and component arrangement boxes from a server to a client.

FIG. 5 is a flowchart illustrating an example method for providing a component map box and component arrangement boxes from a server to a client. FIG. 5 also illustrates an example method for using the component map box and component arrangement boxes to select components to form a presentation, and to request encoded samples of the selected components. Although generally described with respect to source device 20 and destination device 40 of FIG. 1, it should be understood that other devices may implement the techniques of FIG. 5. For example, any server and client configured to communicate via a streaming protocol may implement these techniques.

Initially, source device 20 may receive encoded video samples (200). Source device 20 may also receive encoded audio samples. The received samples correspond to a common content. The received samples may correspond to various components of the content. Source device 20 may determine which components the samples correspond to. Source device 20 may also store the samples in one or more files as components of the content (202). Source device 20 may arrange the samples in the form of fragments, such that a component may include one or more fragments, and fragments of the same component may be stored in separate files.

After storing components of content in one or more files, source device 20 may produce component arrangement boxes for each of the files (204). As discussed above, the component arrangement boxes may provide a mapping between component identifiers and track identifiers of the file. Source device 20 may also produce a component map box that describes all of the components of the content (206). As discussed above, the component map box may describe characteristics of components of the content, such as, for example, bit rates, frame rates, resolution, codec information, profile and level information, dependencies between components, segment information, multiplexing intervals, segment information describing byte ranges of fragments within components of the content, and/or 3D video information.

In some examples, source device 20 may store the files including the encoded video samples and the component arrangement boxes, as well as the component map box, locally within source device 20. In other examples, source device 20 may send the files and component map box to a separate server device to be provided to clients via a streaming network protocol. In the example of FIG. 5, it is assumed that source device 20 stores the files and implements a streaming network protocol, such as HTTP streaming.

Accordingly, destination device 40 may request the component map box and component arrangement boxes from source device 20 (208). For example, destination device 40 may send a request for the component map box and component arrangement boxes to source device 20 in accordance with HTTP streaming, e.g., a HEAD request directed at a URL associated with the content. In response to receiving the request (210), source device 20 may provide the component map box and component arrangement boxes to destination device 40 (212).

After receiving the component map box and component arrangement boxes (214), destination device 40 may determine components to request based on data contained within the component map box. For example, destination device 40 may determine whether destination device 40 is capable of decoding and rendering particular components based on the resolution, frame rate, codec information, profile and level information, and 3D video information. Destination device 40 may also determine current network conditions, such as available bandwidth, and select components based on the current network conditions. For example, destination device 40 may select components having a relatively lower bitrate when less bandwidth is available, or relatively higher bitrate when more bandwidth is available. As another example, destination device 40 may select an multiplexing interval based on current network conditions, and modify the multiplexing interval based on possible multiplexing intervals as indicated by the box, to adapt to changing network conditions. If a selected component is dependent on another component, destination device 40 may request both the selected component and the component on which the selected component is dependent.

After selecting components to request, destination device 40 may determine files storing data for the selected components based on the received component arrangement boxes (218). For example, destination device 40 may analyze the component arrangement boxes to determine whether a file has a mapping between a component identifier of a selected component and a track of the file. If so, destination device 40 may request data from the file, e.g., in accordance with a streaming network protocol (220). The requests may comprise HTTP Get or partial Get requests to URLs or URNs of the files, and possibly specifying a byte range of the files, where the byte ranges may correspond to fragments of the components stored by the files.

Destination device 40 may submit multiple requests to retrieve sequential portions of the components, based on a selected multiplexing interval. That is, initially, destination device 40 may first request fragments from each of the selected components. Destination device 40 may then determine, for a next multiplexing interval, whether there is a fragment beginning within the next multiplexing interval for each component, and if so, request the fragment(s). In this manner, destination device 40 may request fragments from the components based on a multiplexing interval. Destination device 40 may also periodically re-evaluate network conditions to perform adaptation to the changing network conditions, e.g., by changing the multiplexing interval or requesting data from different components. In any case, in response to the requests, source device 20 may output the requested data to destination device 40 (222).

In one or more examples, the described techniques may be implemented in hardware, software, firmware, or any combination thereof. If implemented in software, the functions may be stored or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of sending encapsulated video data, the method comprising:
   sending, via a Hypertext Transfer Protocol (HTTP)-based network streaming protocol, a manifest file comprising characteristics for components of a plurality of alternative representations of video content to a client device, wherein the characteristics comprise at least one of a frame rate, a profile indicator, a level indicator, and dependencies between the components, and wherein the manifest file conforms to the HTTP-based network streaming protocol;
   receiving, via the HTTP-based network streaming protocol, a request from the client device for at least one of the components after sending the manifest file; and
   sending, via the HTTP-based network streaming protocol, the requested components to the client device in response to the request.

2. The method of claim 1, wherein at least two of the components are stored in separate files, and wherein the manifest file comprises characteristics for each of the at least two of the components.

3. The method of claim 1, further comprising:
   storing the manifest file separately from one or more files storing encoded samples for the components,
   wherein sending the manifest file comprises:
      receiving a first request for the manifest file; and
      sending the manifest file independently of the one or more files storing the encoded samples in response to the first request, and wherein the request for the at least one of the video components comprises a second, different request.

4. The method of claim 1, wherein the manifest file is separate from the components, the method further comprising:
assigning an identifier to the manifest file that associates the manifest file with a multimedia content comprising the plurality of alternative representations; and
assigning unique identifiers to the representations of the multimedia content.

5. The method of claim 1, further comprising sending component identifier values for the components, wherein at least one of the component identifier values is different than a track identifier value for the component corresponding to the at least one of the component identifier values.

6. The method of claim 5, further comprising sending information indicating a correspondence between component identifier values for the components and track identifier values for the components in one or more files storing encoded samples for the components.

7. The method of claim 6, further comprising sending, for each of the components of the one or more files, information indicative of byte offsets to fragments within the component, decoding times of first samples in the fragments, random access points in the fragments, and indications of whether the fragments belong to a new segment of the component.

8. The method of claim 1, further comprising sending information indicating that a set of the components are switchable to each other, and wherein the request specifies at least one of the set of components.

9. The method of claim 1, further comprising sending information indicative of the dependencies between the components and an ordering of the dependencies between the components for a decoding order of the components in an access unit.

10. The method of claim 1, further comprising sending information indicative of the dependencies between the components and a temporal layer difference between a first component and a second component that is dependent on the first component.

11. The method of claim 1, further comprising sending information indicative of a number of target views for output for one or more of the plurality of alternative representations.

12. The method of claim 1, further comprising sending information indicative of possible multiplexing intervals for a combination of two or more of the components, and wherein the request specifies fragments of any of the two or more of the components having decoding times within a common one of the multiplexing intervals.

13. The method of claim 1, wherein the characteristics comprise a first set of characteristics, and wherein sending the manifest file comprising the characteristics comprises sending information indicative of a first temporal duration of the components to which the first set of characteristics correspond, the method further comprising sending a second set of characteristics for the components and a second temporal duration of the components to which the second set of characteristics correspond.

14. An apparatus for sending encapsulated video data, the apparatus comprising:
a processor configured to determine characteristics for components of a plurality of alternative representations of video content, wherein the characteristics comprise at least one of a frame rate, a profile indicator, a level indicator, and dependencies between the components, and to form a manifest file comprising the characteristics, and wherein the manifest file conforms to a Hypertext Transfer Protocol (HTTP)-based network streaming protocol; and
one or more interfaces configured to:
send, via the HTTP-based network streaming protocol the manifest file to a client device,
receive, via the HTTP-based network streaming protocol, a request from the client device for at least one of the components after sending the manifest file, and
send, via the HTTP-based network streaming protocol, the requested components to the client device in response to the request.

15. The apparatus of claim 14, wherein the characteristics further comprise component identifier values for the components, wherein at least one of the component identifier values is different than a track identifier value for the component corresponding to the at least one of the component identifier values, and wherein the characteristics comprise information indicating a correspondence between component identifier values for the components and track identifier values for the components in one or more files storing encoded samples for the components.

16. The apparatus of claim 15, wherein the characteristics further comprise, for each of the components of the one or more files, information indicative of byte offsets to fragments within the component, decoding times of first samples in the fragments, random access points in the fragments, and indications of whether the fragment belongs to a new segment of the component.

17. The apparatus of claim 14, wherein the characteristics comprise information indicative of the dependencies between the components and an ordering of the dependencies between the components for a decoding order of the components in an access unit.

18. The apparatus of claim 14, wherein the characteristics comprise information indicative of the dependencies between the components and a temporal layer difference between a first component and a second component that is dependent on the first component.

19. The apparatus of claim 14, wherein the characteristics comprise information indicative of a number of target views for output for one or more of the plurality of alternative representations.

20. The apparatus of claim 14, wherein the characteristics comprise information indicative of possible multiplexing intervals for a combination of two or more of the components, and wherein the request specifies fragments of any of the two or more of the components having decoding times within a common one of the multiplexing intervals.

21. The apparatus of claim 14, wherein the characteristics comprise a first set of characteristics, and wherein the one or more interfaces are configured to send information indicative of a first temporal duration of the components to which the first set of characteristics correspond, and wherein the processor is further configured to generate a second set of characteristics for the components and a second temporal duration of the components to which the second set of characteristics correspond, and wherein the one or more interfaces are configured to send the second set of characteristics.

22. The apparatus of claim 14, wherein the apparatus comprises at least one of:
an integrated circuit;
a microprocessor; and
a wireless communication device that includes the processor.

23. An apparatus for sending encapsulated video data, the apparatus comprising:

means for sending, via a Hypertext Transfer Protocol (HTTP)-based network streaming protocol, a manifest file comprising characteristics for components of a plurality of alternative representations of video content to a client device, wherein the characteristics comprise at least one of a frame rate, a profile indicator, a level indicator, and dependencies between the components, and wherein the manifest file conforms to the HTTP-based network streaming protocol;

means for receiving, via the HTTP-based network streaming protocol, a request from the client device for at least one of the components after sending the manifest file; and means for sending, via the HTTP-based network streaming protocol, the requested components to the client device in response to the request.

24. The apparatus of claim 23, wherein means for sending the manifest file further comprises:

means for sending component identifier values for the components, wherein at least one of the component identifier values is different than a track identifier value for the component corresponding to the at least one of the component identifier values;

means for sending information indicating a correspondence between component identifier values for the components and track identifier values for the components in one or more files storing encoded samples for the components; and means for sending, for each of the components of the one or more files, information indicative of byte offsets to fragments within the component, decoding times of first samples in the fragments, random access points in the fragments, and indications of whether the fragment belongs to a new segment of the component.

25. The apparatus of claim 23, wherein the means for sending the manifest file comprises means for sending information indicative of the dependencies between the components and an ordering of the dependencies between the components for a decoding order of the components in an access unit.

26. The apparatus of claim 23, wherein the means for sending the manifest file comprises means for sending information indicative of the dependencies between the components and a temporal layer difference between a first component and a second component that is dependent on the first component.

27. The apparatus of claim 23, wherein the means for sending the manifest file comprises means for sending information indicative of possible multiplexing intervals for a combination of two or more of the components, and wherein the request specifies fragments of any of the two or more of the components having decoding times within a common one of the multiplexing intervals.

28. The apparatus of claim 23, wherein the characteristics comprise a first set of characteristics, and wherein the means for sending the manifest file comprises means for sending information indicative of a first temporal duration of the components to which the first set of characteristics correspond, further comprising means for sending a second set of characteristics for the components and a second temporal duration of the components to which the second set of characteristics correspond.

29. A computer program product comprising a computer-readable storage medium having stored thereon instructions that, when executed, cause a processor of a source device for sending encoded video data to:

send, via a Hypertext Transfer Protocol (HTTP)-based network streaming protocol, a manifest file comprising characteristics for components of a plurality of alternative representations of video content to a client device, wherein the characteristics comprise at least one of a frame rate, a profile indicator, a level indicator, and dependencies between the components, and wherein the manifest file conforms to a Hypertext Transfer Protocol (HTTP)-based network streaming protocol;

receive, via the HTTP-based network streaming protcol, a request from the client device for at least one of the components after sending the manifest file; and send, via the HTTP-based network streaming protcol, the requested components to the client device in response to the request.

30. The computer program product of claim 29, wherein the instructions that cause the processor to send the manifest file further comprises instructions that cause the processor to:

send component identifier values for the components, wherein at least one of the component identifier values is different than a track identifier value for the component corresponding to the at least one of the component identifier values;

send information indicating a correspondence between component identifier values for the components and track identifier values for the components in one or more files storing encoded samples for the components; and send, for each of the components of the one or more files, information indicative of byte offsets to fragments within the component, decoding times of first samples in the fragments, random access points in the fragments, and indications of whether the fragment belongs to a new segment of the component.

31. The computer program product of claim 29, wherein the instructions that cause the processor to send the manifest file comprise instructions that cause the processor to send information indicative of the dependencies between the components, an ordering of the dependencies between the components for a decoding order of the components in an access unit, and a temporal layer difference between a first component and a second component that is dependent on the first component.

32. The computer program product of claim 29, wherein the instructions that cause the processor to send the manifest file comprise instructions that cause the processor to send information indicative of a number of target views for output for one or more of the plurality of alternative representations.

33. The computer program product of claim 29, wherein the instructions that cause the processor to send the manifest file comprise instructions that cause the processor to send information indicative of possible multiplexing intervals for a combination of two or more of the components, and wherein the request specifies fragments of any of the two or more of the components having decoding times within a common one of the multiplexing intervals.

34. The computer program product of claim 29, wherein the characteristics comprise a first set of characteristics, and further comprising instructions that cause the processor to send information indicative of a first temporal duration of the components to which the first set of characteristics correspond, and to send a second set of characteristics for the components and a second temporal duration of the components to which the second set of characteristics correspond.

35. A method of receiving encapsulated video data, the method comprising:

requesting, via a Hypertext Transfer Protocol (HTTP)-based network streaming protocol, a manifest file comprising characteristics for components of a plurality of alternative representations of video content from a source device, wherein the characteristics comprise at least one of a frame rate, a profile indicator, a level indicator, and dependencies between the components, and wherein the manifest file conforms to the HTTP-based network streaming protocol;

selecting one or more of the components based on the characteristics;

requesting, via the HTTP-based network streaming protocol, samples of the selected components; and decoding and presenting the samples after the samples have been received.

36. The method of claim 35, further comprising:

receiving information indicating a correspondence between component identifier values for the selected components and track identifier values for the components in one or more files storing encoded samples for the components; and receiving information indicative of byte offsets to fragments within each of the selected components, decoding times of first samples in the fragments, random access points in the fragments, and indications of whether the fragments belongs to new segments of the respective components;

wherein requesting the samples comprises requesting samples from tracks of the one or more files corresponding to the track identifier values corresponding to the component identifier values for the selected components based on the byte offsets, the decoding times, the random access points, and the indications of whether the fragments belong to new segments.

37. The method of claim 35, further comprising:

receiving information indicating that at least one of the selected components is dependent on another component; and requesting samples of the component on which the one of the selected components is dependent.

38. The method of claim 35, wherein requesting the samples of the selected components comprises:

determining a next multiplexing interval;

determining ones of the selected components having fragments that start in the next multiplexing interval; and requesting the fragments that start in the next multiplexing interval from the determined ones of the selected components.

39. The method of claim 35, wherein the characteristics comprise a first set of characteristics, the method further comprising:

receiving information indicative of a first temporal duration of the components to which the first set of characteristics correspond;

requesting a second set of characteristics for the components corresponding to a second temporal duration of the components to which the second set of characteristics correspond; and requesting samples from the components corresponding to the second temporal duration based on the second set of characteristics.

40. An apparatus for receiving encapsulated video data, the apparatus comprising:

one or more interfaces configured to request, via a Hypertext Transfer Protocol (HTTP)-based network streaming protocol a manifest file comprising characteristics for components of a plurality of alternative representations of video content from a source device, wherein the characteristics comprise at least one of a frame rate, a profile indicator, a level indicator, and dependencies between the components, and wherein the manifest file conforms to a Hypertext Transfer Protocol (HTTP)-based network streaming protocol; and a processor configured to select one or more of the components based on the characteristics, and to cause the one or more interfaces to submit requests, via the HTTP-based network streaming protocol, for samples of the selected components to the source device.

41. The apparatus of claim 40, wherein the processor is configured to receive information indicating a correspondence between component identifier values for the selected components and track identifier values for the components in one or more files storing encoded samples for the components, receive information indicative of byte offsets to fragments within each of the selected components, decoding times of first samples in the fragments, random access points in the fragments, and indications of whether the fragments belongs to new segments of the respective components, and to construct the requests for the samples from tracks of the one or more files corresponding to the track identifier values corresponding to the component identifier values for the selected components based on the byte offsets, the decoding times, the random access points, and the indications of whether the fragments belong to new segments.

42. The apparatus of claim 40, wherein the processor is configured to receive information indicating that at least one of the selected components is dependent on another component, and request samples of the component on which the one of the selected components is dependent.

43. The apparatus of claim 40, wherein to generate the requests for the samples of the selected components, the processor is configured to determine a next multiplexing interval, determine ones of the selected components having fragments that start in the next multiplexing interval, and request the fragments that start in the next multiplexing interval from the determined ones of the selected components.

44. The apparatus of claim 40, wherein the characteristics comprise a first set of characteristics, and wherein the processor is configured to receive information indicative of a first temporal duration of the components to which the first set of characteristics correspond, request a second set of characteristics for the components corresponding to a second temporal duration of the components to which the second set of characteristics correspond, and request samples from the components corresponding to the second temporal duration based on the second set of characteristics.

45. An apparatus for receiving encapsulated video data, the apparatus comprising:

means for requesting, via a Hypertext Transfer Protocol (HTTP)-based network streaming protocol, a manifest file comprising characteristics for components of a plurality of alternative representations of video content from a source device, wherein the characteristics comprise at least one of a frame rate, a profile indicator, a level indicator, and dependencies between the components, and wherein the manifest file conforms to the HTTP-based network streaming protocol;

means for selecting one or more of the components based on the characteristics;

means for requesting, via the HTTP-based network streaming protocol, samples of the selected components; and means for decoding and presenting the samples after the samples have been received.

46. The apparatus of claim 45, further comprising:

means for receiving information indicating a correspondence between component identifier values for the selected components and track identifier values for the components in one or more files storing encoded samples for the components; and means for receiving information indicative of byte offsets to fragments within each of the selected components, decoding times of first samples in the fragments, random access points in the fragments, and indications of whether the fragments belongs to new segments of the respective components;

wherein the means for requesting the samples comprises means for requesting samples from tracks of the one or more files corresponding to the track identifier values corresponding to the component identifier values for the selected components based on the byte offsets, the decoding times, the random access points, and the indications of whether the fragments belong to new segments.

47. The apparatus of claim 45, further comprising:
means for receiving information indicating that at least one of the selected components is dependent on another component; and
means for requesting samples of the component on which the one of the selected components is dependent.

48. The apparatus of claim 45, wherein the means for requesting the samples of the selected components comprises:
means for determining a next multiplexing interval;
means for determining ones of the selected components having fragments that start in the next multiplexing interval; and
means for requesting the fragments that start in the next multiplexing interval from the determined ones of the selected components.

49. The apparatus of claim 45, wherein the characteristics comprise a first set of characteristics, the apparatus further comprising:
means for receiving information indicative of a first temporal duration of the components to which the first set of characteristics correspond;
means for requesting a second set of characteristics for the components corresponding to a second temporal duration of the components to which the second set of characteristics correspond; and
means for requesting samples from the components corresponding to the second temporal duration based on the second set of characteristics.

50. A computer program product comprising a computer readable storage medium having stored thereon instructions that, when executed, cause a processor of a device for receiving encapsulated video data to:
request, via a Hypertext Transfer Protocol (HTTP)-based network streaming protocol, a manifest file comprising characteristics for components of a plurality of alternative representations of video content from a source device, wherein the characteristics comprise at least one of a frame rate, a profile indicator, a level indicator, and dependencies between the components, and wherein the manifest file conforms to the HTTP-based network streaming protocol;
select one or more of the components based on the characteristics;
request, via the HTTP-based network streaming protocol, samples of the selected components; and
decode and present the samples after the samples have been received.

51. The computer program product of claim 50, further comprising instructions that cause the processor to:
receive information indicating a correspondence between component identifier values for the selected components and track identifier values for the components in one or more files storing encoded samples for the components; and
receive information indicative of byte offsets to fragments within each of the selected components, decoding times of first samples in the fragments, random access points in the fragments, and indications of whether the fragments belongs to new segments of the respective components;
wherein the instructions that cause the processor to request the samples comprise instructions that cause the processor to request samples from tracks of the one or more files corresponding to the track identifier values corresponding to the component identifier values for the selected components based on the byte offsets, the decoding times, the random access points, and the indications of whether the fragments belong to new segments.

52. The computer program product of claim 50, further comprising instructions that cause the processor to:
receive information indicating that at least one of the selected components is dependent on another component; and
request samples of the component on which the one of the selected components is dependent.

53. The computer program product of claim 50, wherein the instructions that cause the processor to request the samples of the selected components comprise instructions that cause the processor to:
determine a next multiplexing interval;
determine ones of the selected components having fragments that start in the next multiplexing interval; and
request the fragments that start in the next multiplexing interval from the determined ones of the selected components.

54. The computer program product of claim 50, wherein the characteristics comprise a first set of characteristics, further comprising instructions that cause the processor to:
receive information indicative of a first temporal duration of the components to which the first set of characteristics correspond;
request a second set of characteristics for the components corresponding to a second temporal duration of the components to which the second set of characteristics correspond; and
request samples from the components corresponding to the second temporal duration based on the second set of characteristics.

* * * * *